(12) United States Patent
Yagi

(10) Patent No.: US 9,285,613 B2
(45) Date of Patent: Mar. 15, 2016

(54) SEMICONDUCTOR MACH-ZEHNDER MODULATOR AND METHOD FOR MANUFACTURING SEMICONDUCTOR MACH-ZEHNDER MODULATORS

(71) Applicant: SUMITOMO ELECTRIC INDUSTRIES, LTD., Osaka-shi, Osaka (JP)

(72) Inventor: Hideki Yagi, Machida (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 14 days.

(21) Appl. No.: 13/899,986

(22) Filed: May 22, 2013

(65) Prior Publication Data

US 2013/0322808 A1 Dec. 5, 2013

(30) Foreign Application Priority Data

Jun. 4, 2012 (JP) ................................ 2012-127253

(51) Int. Cl.
| | | |
|---|---|---|
| *G02F 1/035* | (2006.01) | |
| *G02F 1/295* | (2006.01) | |
| *G02F 1/025* | (2006.01) | |
| *G02F 1/21* | (2006.01) | |
| *G02F 1/313* | (2006.01) | |

(52) U.S. Cl.
CPC ............... *G02F 1/025* (2013.01); *G02F 1/218* (2013.01); *G02F 1/3136* (2013.01); *G02F 1/3138* (2013.01); *G02F 2001/217* (2013.01)

(58) Field of Classification Search
CPC  G02F 2001/212; G02F 1/2255; G02F 1/3133
USPC .............................. 385/1–3, 9, 14, 15, 44, 45
See application file for complete search history.

(56) References Cited

U.S. PATENT DOCUMENTS

| | | | |
|---|---|---|---|
| 2008/0197377 A1* | 8/2008 | Sudo et al. ....................... 257/99 |
| 2010/0142026 A1* | 6/2010 | Kato ............................. 359/248 |
| 2012/0033284 A1* | 2/2012 | Fukuda .......................... 359/248 |

FOREIGN PATENT DOCUMENTS

| | | |
|---|---|---|
| JP | 2006-276497 | 10/2006 |
| JP | 2008-10484 A | 1/2008 |

(Continued)

OTHER PUBLICATIONS

K. Tsuzuki, et al., 40 Gbit/s n-i-n InP Mach-Zehnder modulator with a π voltage of 2.2 V, Electronic Letters, vol. 39, No. 20, Oct. 2, 2003 (2 sheets).

(Continued)

*Primary Examiner* — Kaveh C Kianni
*Assistant Examiner* — Hung Lam
(74) *Attorney, Agent, or Firm* — Smith, Gambrell & Russell, LLP.

(57) ABSTRACT

A semiconductor Mach-Zehnder modulator includes a substrate having a main surface including first, second and third regions sequentially arranged along a direction; a waveguide mesa including first and second waveguide arms provided on the second region, first and second optical couplers provided on the first and third regions, respectively; a first semiconductor protective layer provided on side surfaces of the first and second waveguide arms; a buried layer provided on side surfaces of the waveguide mesa and on the main surface, the buried layer including a material having a dielectric constant lower than that of the first protective layer; and first and second upper electrodes provided on the first and second waveguide arms, respectively. The first and second optical couplers are connected to the first and second waveguide arms. Above the second region, the buried layer is provided on the first protective layer.

6 Claims, 19 Drawing Sheets

(56) References Cited

FOREIGN PATENT DOCUMENTS

| | | |
|---|---|---|
| JP | 2010-008869 | 1/2010 |
| JP | 2011-203382 | 10/2011 |

OTHER PUBLICATIONS

Notification of Reasons for Rejection dated Jan. 5, 2016 for Japanese Patent Application No. 2012-127253 w/partial English Translation.

* cited by examiner

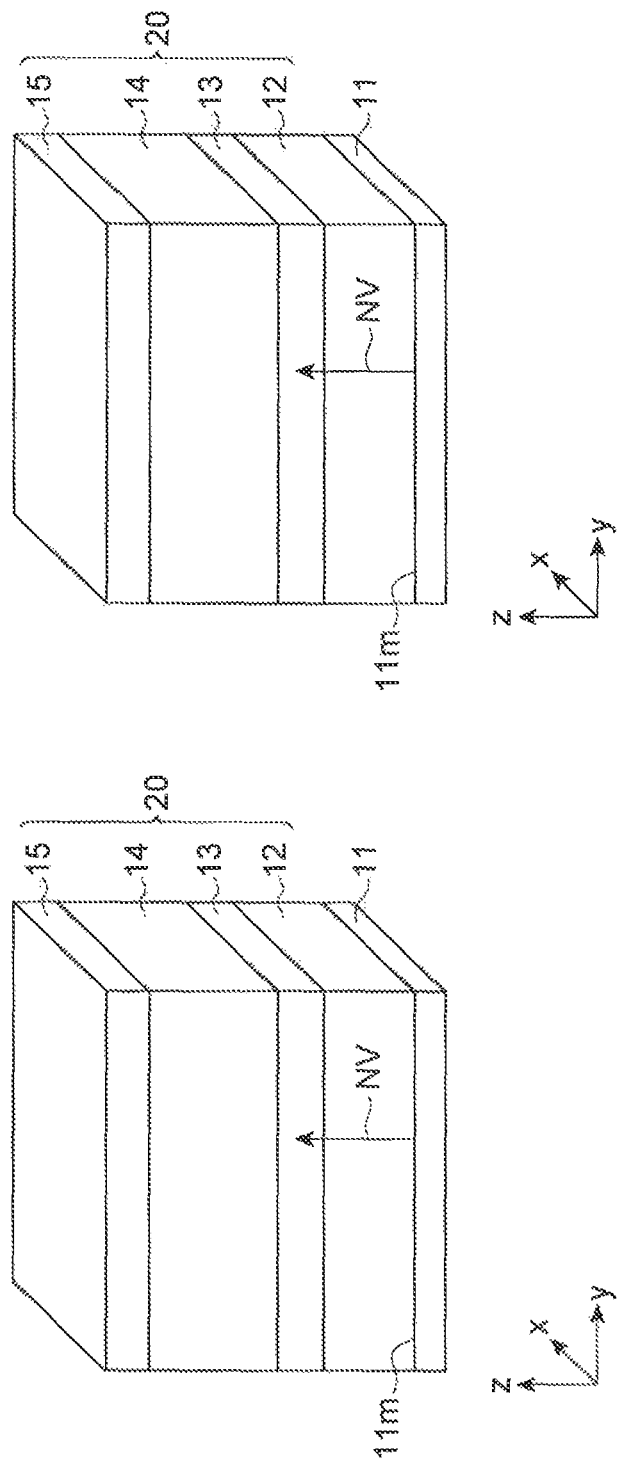

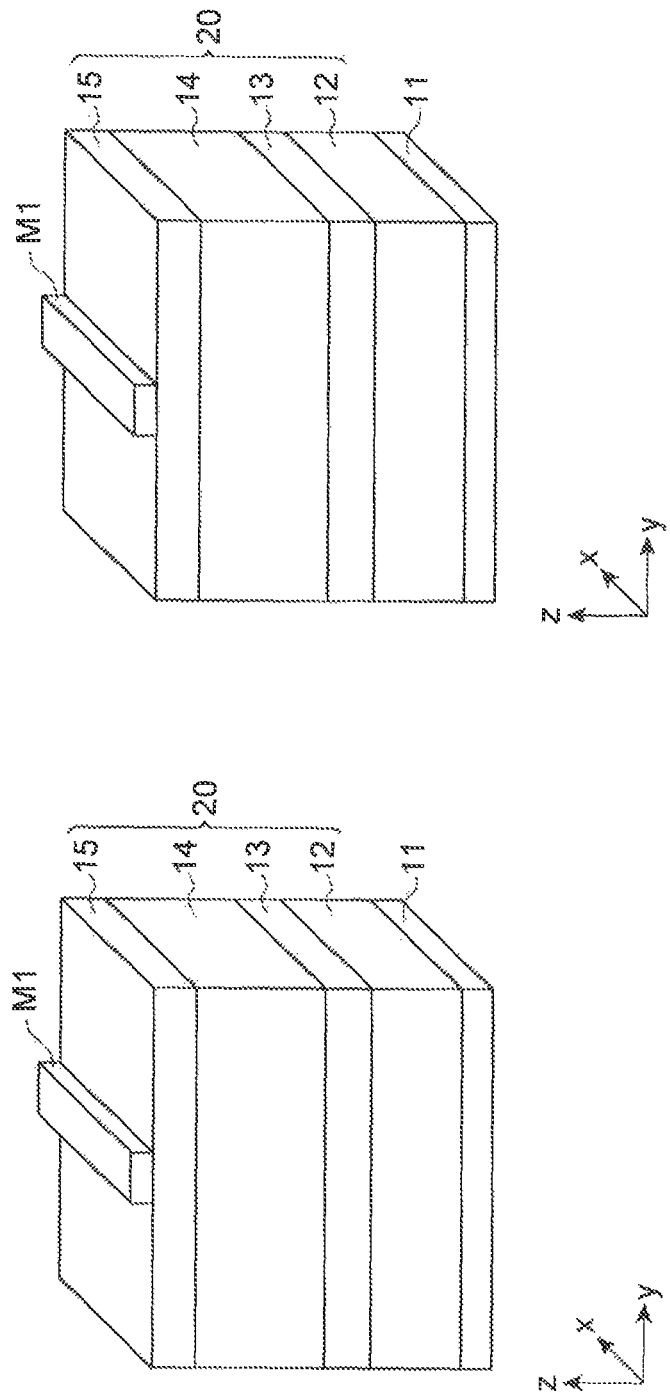

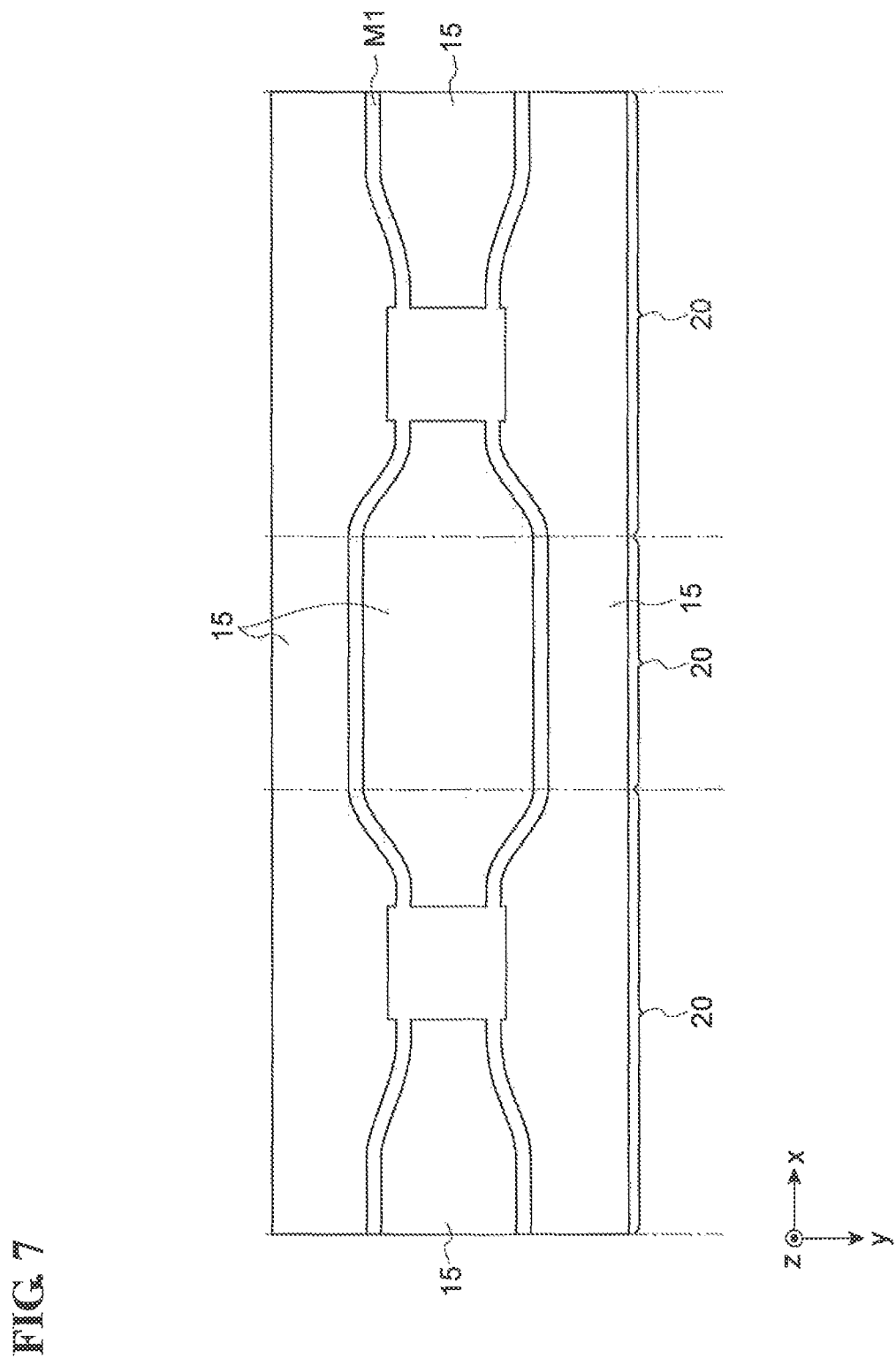

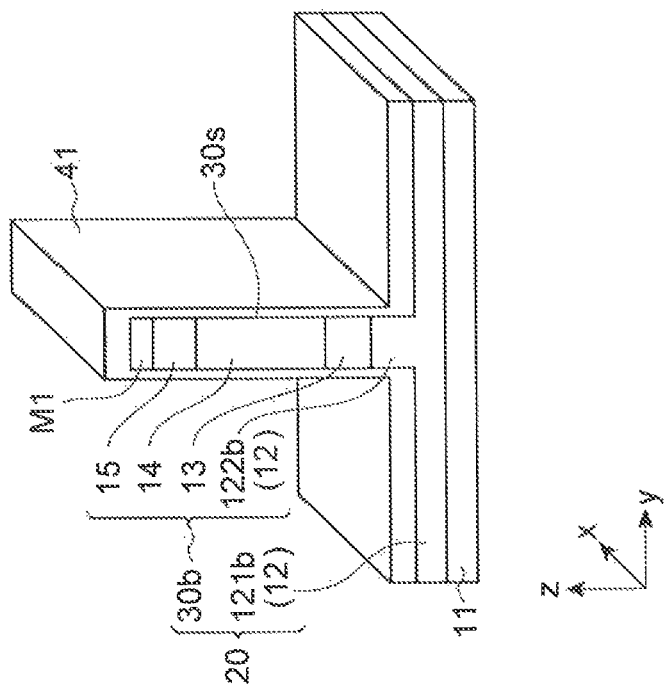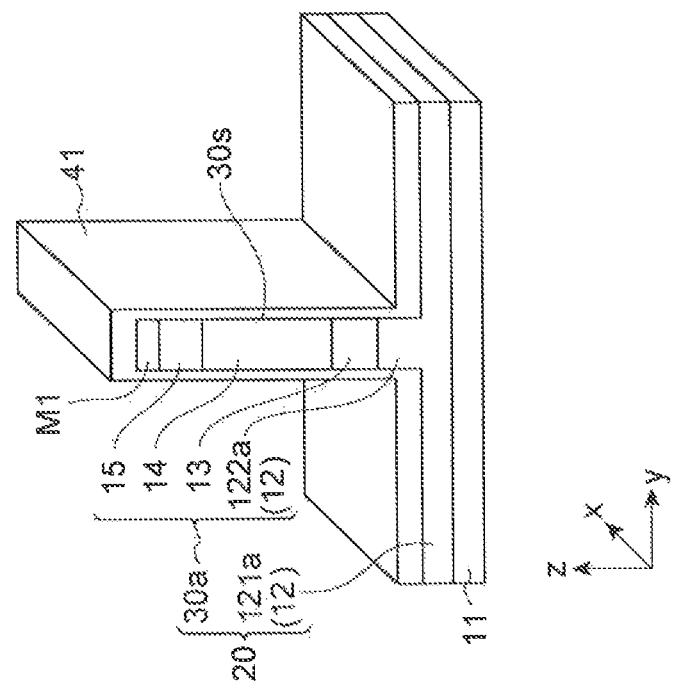

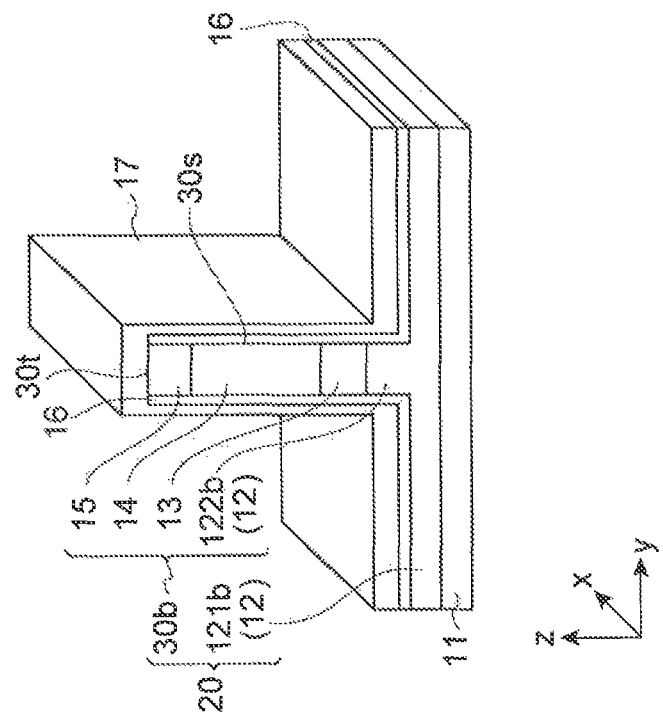
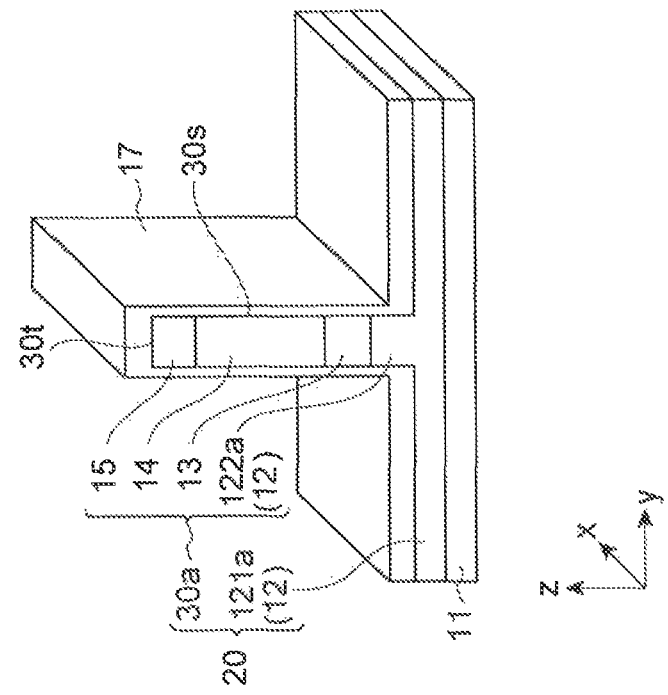

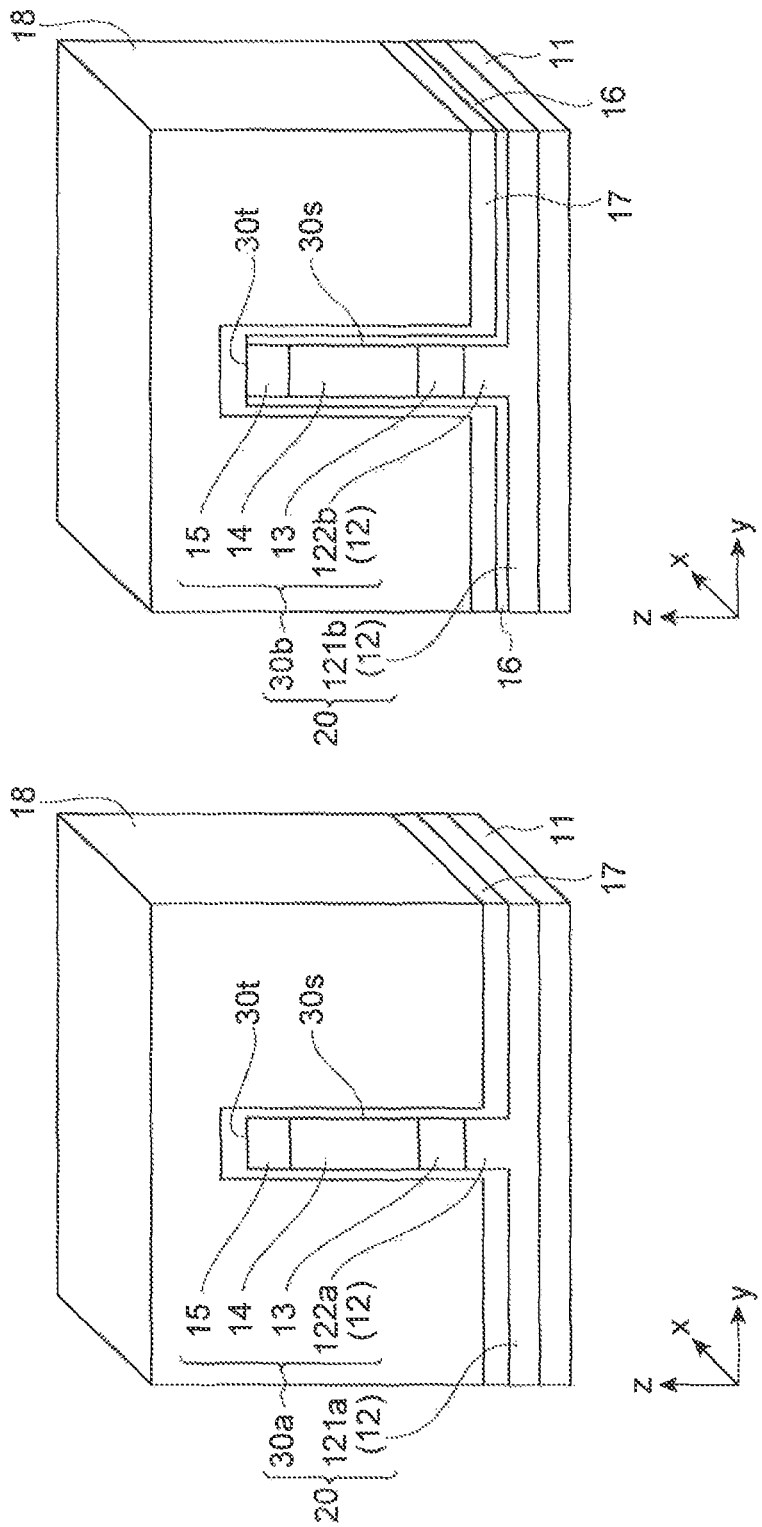

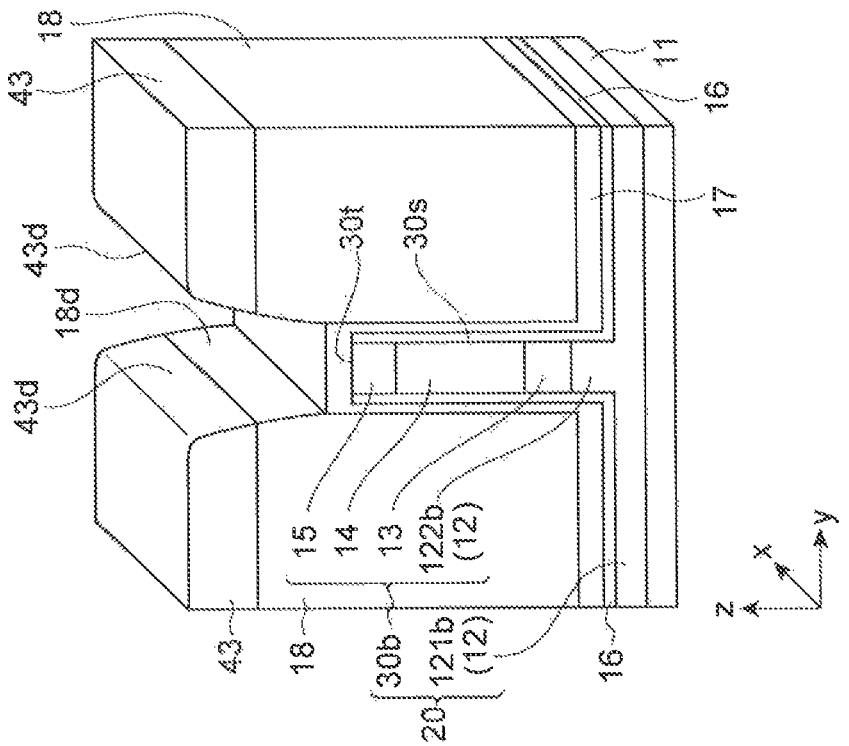
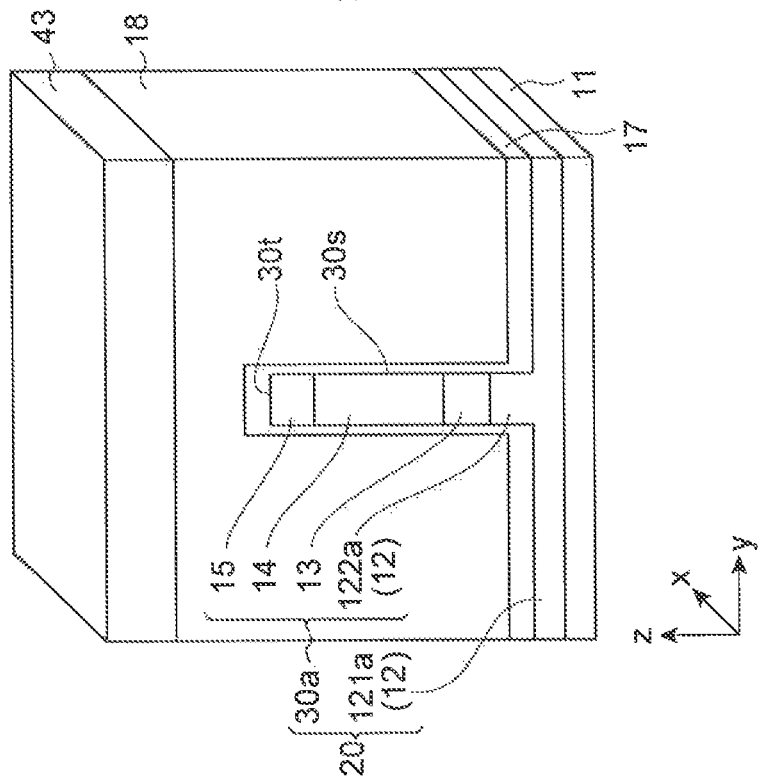

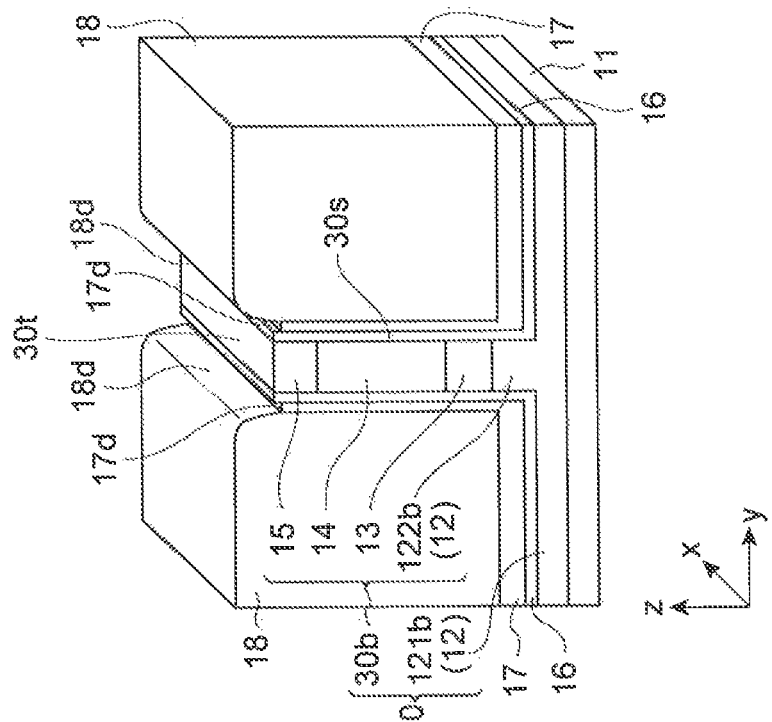
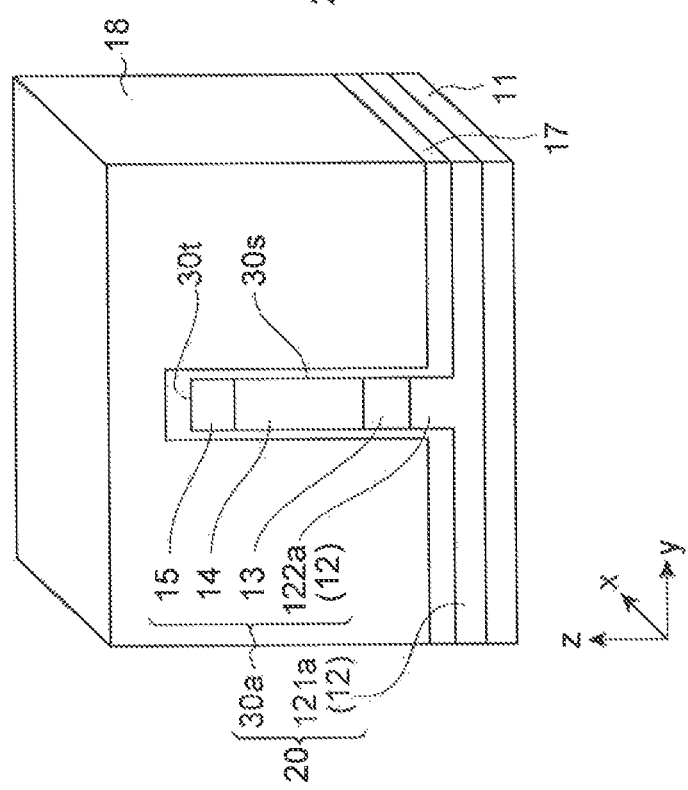

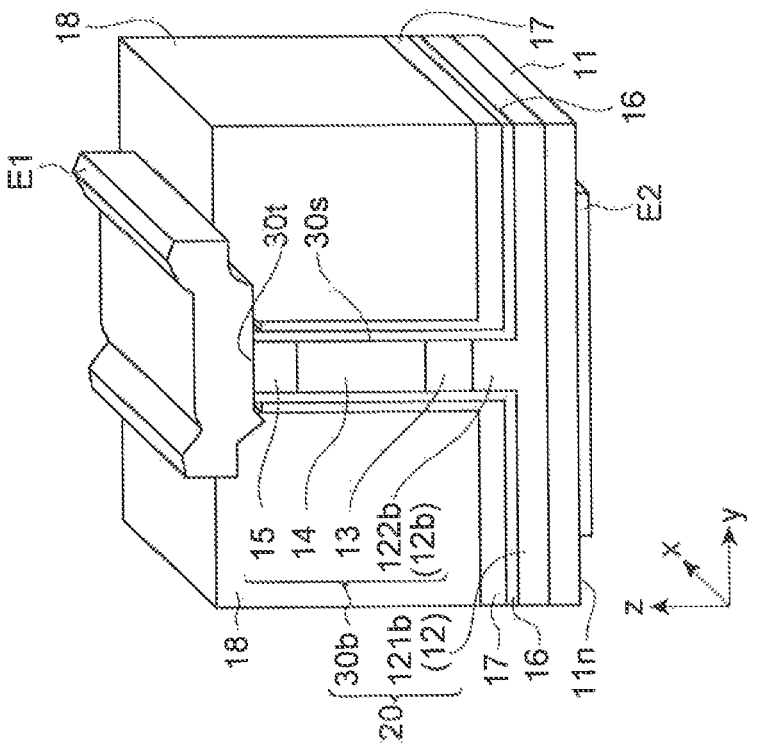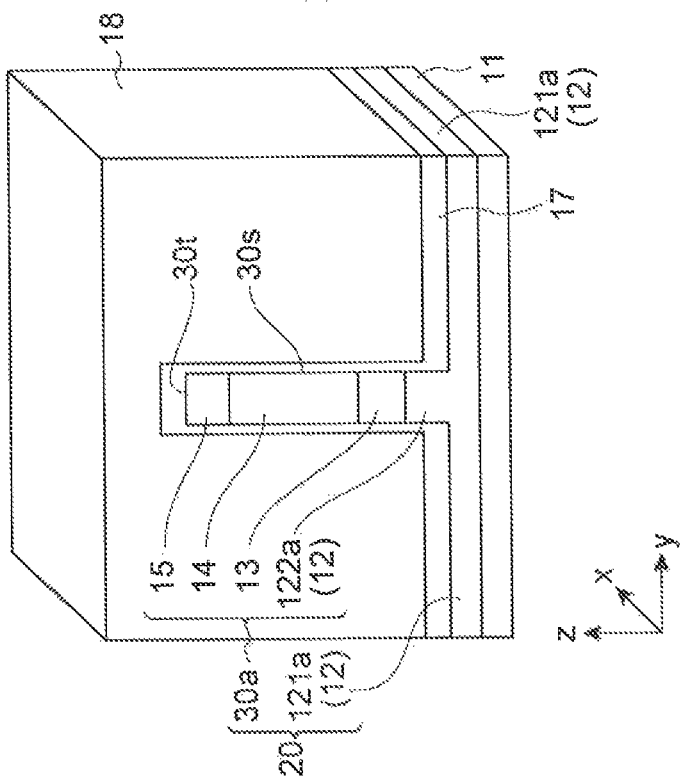

SEMICONDUCTOR MACH-ZEHNDER MODULATOR AND METHOD FOR MANUFACTURING SEMICONDUCTOR MACH-ZEHNDER MODULATORS

BACKGROUND OF THE INVENTION

1. Field of the Invention

The present invention relates to semiconductor Mach-Zehnder modulators, and methods for manufacturing semiconductor Mach-Zehnder modulators.

2. Description of the Related Art

Mach-Zehnder modulators having a high-mesa waveguide are conventionally known. For example, Non-Patent Literature 1 (K. Tsuzuki et al., "40 Gbit/s n-i-n InP Mach-Zehnder modulator with a π voltage of 2.2 V", Electron. Lett., Vol. 39, pp. 1464-1466, 2003) describes Mach-Zehnder modulators in which side surfaces of high-mesa structures are buried in a benzocyclobutene (BCB) resin.

SUMMARY OF THE INVENTION

Mach-Zehnder modulators modulate the phase of light propagating in the waveguide by applying a voltage to a waveguide in a modulation region. In the Mach-Zehnder modulators described in Non-Patent Literature 1, non-radiative recombination occurs at a boundary between the high-mesa side surface and the BCB resin. Thus, when a voltage is applied via electrodes to a waveguide in a modulation region, leakage current is caused at the high-mesa side surfaces in the modulation region. The occurrence of leakage current reduces the voltage applied to the waveguide. As a result, desired phase modulation may not be obtained.

A semiconductor Mach-Zehnder modulator according to the present invention includes a substrate having a main surface, the main surface including a first region, a second region and a third region sequentially arranged along a direction intersecting with a normal vector of the main surface; a waveguide mesa including a first waveguide arm and a second waveguide arm provided on the second region, a first optical coupler provided on the first region, and a second optical coupler provided on the third region; a first protective layer provided on side surfaces of the first waveguide arm and on side surfaces of the second waveguide arm, the first protective layer being formed of a semiconductor layer; a buried layer provided on side surfaces of the waveguide mesa and on the main surface of the substrate, the buried layer including a material having a dielectric constant lower than that of the first protective layer; a first upper electrode provided on the first waveguide arm; and a second upper electrode provided on the second waveguide arm. The first optical coupler is connected to the first waveguide arm and the second waveguide arm. The second optical coupler is connected to the first waveguide arm and the second waveguide arm. In addition, above the second region, the buried layer is provided on the first protective layer that is provided on the side surfaces of the first waveguide arm and on the side surfaces of the second waveguide arm, and above the first region and the third region, the buried layer is provided on side surfaces of the first optical coupler and on side surfaces of the second optical coupler, the first and second optical couplers having the side surfaces without the first protective layer.

According to such a semiconductor Mach-Zehnder modulator, the first protective layer formed of a semiconductor layer is provided, above the second region of the substrate, on the side surfaces of the first waveguide arm and on the side surfaces of the second waveguide arm. On the other hand, above the first region and the third region, the first protective layer is not formed on the side surfaces of the waveguide mesa including the first optical coupler and the second optical coupler. Further, the first upper electrode is provided on the first waveguide arm and the second upper electrode is provided on the second waveguide arm. According to this configuration, the first protective layer allows for reducing the leakage current at the side surfaces of the first waveguide arm when a voltage is applied to the first upper electrode. Similarly, the first protective layer allows for reducing the leakage current at the side surfaces of the second waveguide arm when a voltage is applied to the second upper electrode. Consequently, the semiconductor Mach-Zehnder modulator achieves an improvement in the accuracy of optical phase control at the first waveguide arm and the second waveguide arm as well as ensures reliability. Furthermore, the buried layer is provided on side surfaces of the waveguide mesa and on the main surface of the substrate. The buried layer is composed of a material having a dielectric constant lower than that of the first protective layer formed of a semiconductor layer. Above the second region, the buried layer is provided on the first protective layer that is provided on the side surfaces of the first waveguide arm and on the side surfaces of the second waveguide arm. Accordingly, the parasitic capacitance of the first waveguide arm and the second waveguide arm can be reduced. Consequently, high-speed modulation becomes feasible.

The semiconductor Mach-Zehnder modulator may further include a second protective layer formed of a dielectric film. Preferably, above the first region and the third region, the second protective layer is provided between the buried layer and the side surfaces of the first and second optical couplers. Furthermore, above the second region, the second protective layer is provided between the buried layer and the first protective layer provided on the side surfaces of the first and second waveguide arms. In this case, improved adhesion can be obtained between the waveguide mesa and the buried layer above the first region and the third region, and improved adhesion can be obtained between the first protective layer and the buried layer above the second region. Thus, the detachment of the buried layer from the waveguide mesa or the protective layer is avoided. The second protective layer may be formed of a silicon dioxide film or a silicon nitride film.

In the semiconductor Mach-Zehnder modulator according to the present invention, the first optical coupler and the second optical coupler may include a multi-mode interference coupler. Multi-mode interference couplers require highly accurate control of waveguide widths. In the semiconductor Mach-Zehnder modulator, the first protective layer formed of a semiconductor layer is provided on the side surfaces of the first and second waveguide arms above the second region. On the other hand, the first protective layer is not formed on the side surfaces of the waveguide mesa including the first and second optical couplers above the first and third regions. Therefore, the waveguide widths of the first and second optical couplers is controlled with a high accuracy.

In the semiconductor Mach-Zehnder modulator according to the present invention, preferably, the first protective layer is formed of a non-doped semiconductor layer or a semi-insulating semiconductor layer, and the buried layer is formed of a benzocyclobutene resin.

In the semiconductor Mach-Zehnder modulator according to the present invention, the first protective layer may have a thickness between 200 nm and 300 nm. This configuration allows for reducing the leakage current at the side surfaces of the first waveguide arm or at the side surfaces of the second waveguide arm, as well as makes it possible to suppress the parasitic capacitance of the first waveguide arm and the second waveguide arm.

In the semiconductor Mach-Zehnder modulator according to the present invention, the waveguide mesa preferably includes a lower cladding layer, an upper cladding layer, and a core layer provided between the lower cladding layer and the upper cladding layer. The lower cladding layer, the core layer and the upper cladding layer constitute an optical waveguide structure which guides light through the core layer.

BRIEF DESCRIPTION OF THE DRAWINGS

FIGS. 4A and 4B illustrate a step for manufacturing the semiconductor Mach-Zehnder modulator in the method of FIG. 3.

FIGS. 6A and 6B illustrate a step for manufacturing the semiconductor Mach-Zehnder modulator in the method of FIG. 3.

FIG. 7 is a plan view schematically illustrating a first mask.

FIGS. 9A and 9B illustrate a step for manufacturing the semiconductor Mach-Zehnder modulator in the method of FIG. 3.

FIGS. 15A and 15B illustrate a step for manufacturing the semiconductor Mach-Zehnder modulator in the method of FIG. 3.

FIGS. 16A and 16B illustrate a step for manufacturing the semiconductor Mach-Zehnder modulator in the method of FIG. 3.

FIGS. 17A and 17B illustrate a step for manufacturing the semiconductor Mach-Zehnder modulator in the method of FIG. 3.

FIGS. 18A and 18B illustrate a step for manufacturing the semiconductor Mach-Zehnder modulator in the method of FIG. 3.

FIGS. 19A and 19B illustrate a step for manufacturing the semiconductor Mach-Zehnder modulator in the method of FIG. 3.

DESCRIPTION OF THE PREFERRED EMBODIMENTS

Figure 1:
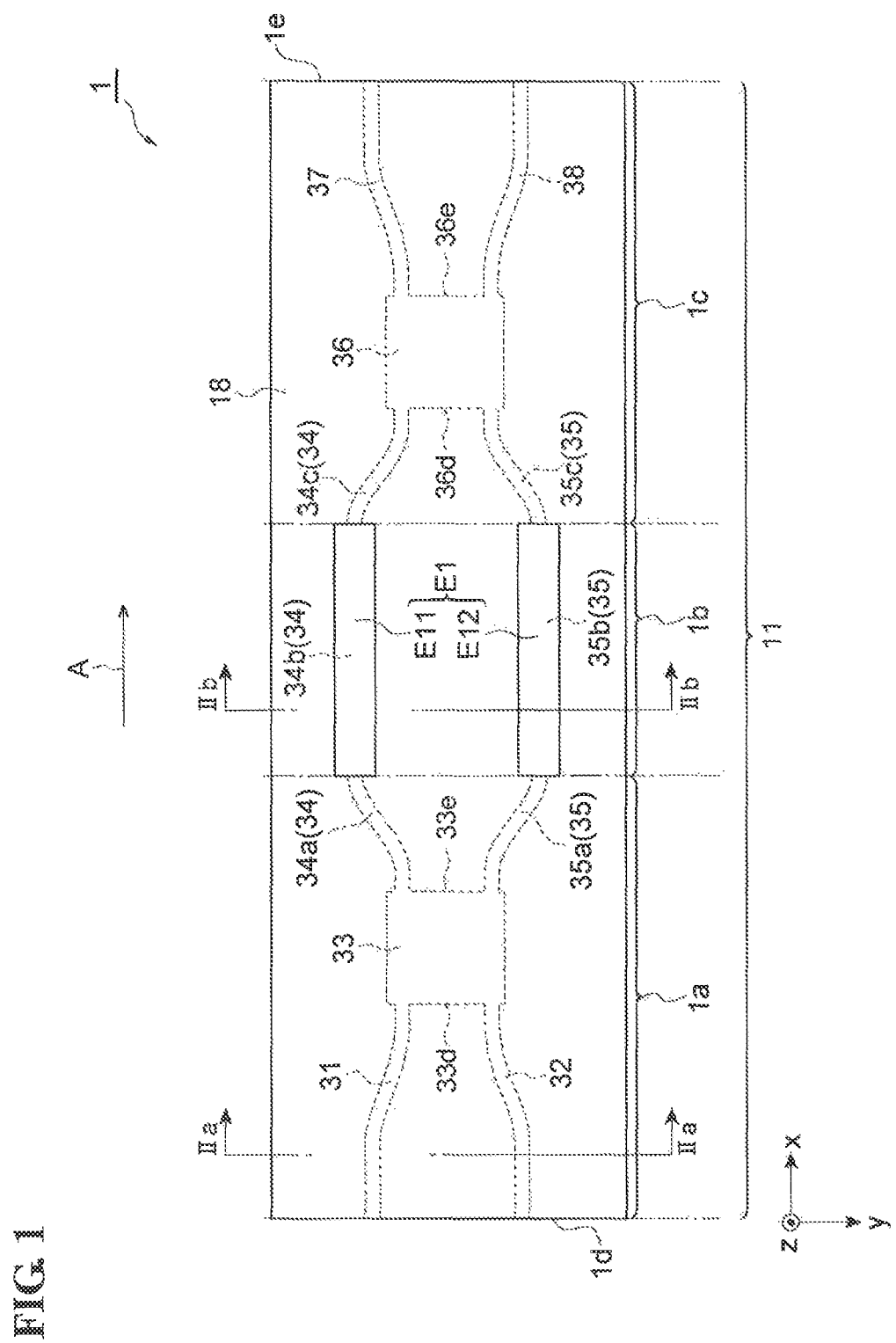
FIG. 1 is a plan view schematically illustrating a semiconductor Mach-Zehnder modulator according to an embodiment.

Hereinbelow, embodiments of the invention will be described in detail with reference to the accompanying drawings. In the drawings, identical or corresponding elements are assigned with the same reference sign, and overlapping descriptions are omitted.

FIG. 1 is a plan view schematically illustrating a semiconductor Mach-Zehnder modulator according to an embodiment. As illustrated in FIG. 1, a semiconductor Mach-Zehnder modulator 1 is formed on a substrate 11 having a main surface 11m (see FIGS. 2A and 2B). The substrate 11 has a first region 1a, a second region 1b and a third region 1c. These first region 1a, second region 1b and third region 1c are arranged sequentially along a direction A that intersects with the normal vector of the main surface 11m of the substrate 11. In this embodiment, the direction A extends from one end section 1d to the other end section 1e of the semiconductor Mach-Zehnder modulator 1. A portion of the semiconductor Mach-Zehnder modulator 1 that is found on the first region 1a is a passive waveguide region which includes a first I/O waveguide 31, a second I/O waveguide 32, a first optical coupler 33, an optical waveguide section 34a of a first waveguide arm 34, and an optical waveguide section 35a of a second waveguide arm 35. A portion of the Mach-Zehnder modulator 1 that is found on the second region 1b is a modulation arm region which includes a phase control section 34b of the first waveguide arm 34, and a phase control section 35b of the second waveguide arm 35. A portion of the Mach-Zehnder modulator 1 that is found on the third region 1c is a passive waveguide region which includes an optical waveguide section 34c of the first waveguide arm 34, an optical waveguide section 35c of the second waveguide arm 35, a second optical coupler 36, a third I/O waveguide 37, and a fourth I/O waveguide 38. In the following description, the reference sign Xa indicates that a portion of the element X is found on the first region 1a, the reference sign Xb indicates that a portion of the element X is found on the second region 1b, and the reference sign Xc indicates that a portion of the element X is found on the third region 1c.

The first I/O waveguide 31 and the second I/O waveguide 32 have a high-mesa waveguide structure, and extend along the direction A from the end section 1d to an end section 33d of the first optical coupler 33. That is, one end of the first I/O waveguide 31 and one end of the second I/O waveguide 32 are connected to the end section 1d. Further, the other end of the first I/O waveguide 31 and the other end of the second I/O waveguide 32 are connected to the end section 33d of the first optical coupler 33. The mesa widths of the first I/O waveguide 31 and the second I/O waveguide 32 are, for example, about 1.5 μm.

The first optical coupler 33 has a high-mesa waveguide structure. At its end section 33d, the first optical coupler 33 is connected to the first I/O waveguide 31 and the second I/O waveguide 32. At its other end section 33e, the first optical coupler 33 is connected to the first waveguide arm 34 and the second waveguide arm 35. For example, the first optical coupler 33 is a multi-mode interference (MMI) coupler. The mesa width of the first optical coupler 33 is, for example, about 10 μm. The length of the first optical coupler 33 along the direction A is, for example, about 200 μm. The wavelength selectivity and the coupling efficiency of the first optical coupler 33 greatly depend on the mesa width and the length of the first optical coupler 33 along the direction A. In order to obtain high coupling efficiency at specific wavelengths, the mesa width of the first optical coupler 33 and the length of the first optical coupler 33 along the direction A need to be controlled with an accuracy of about ±50 nm.

The first waveguide arm 34 and the second waveguide arm 35 have a high-mesa waveguide structure, and extend along the direction A from the end section 33e of the first optical coupler 33 to an end section 36d of the second optical coupler 36. That is, one end of the first waveguide arm 34 and one end of the second waveguide arm 35 are connected to the end section 33e of the first optical coupler 33. Further, the other end of the first waveguide arm 34 and the other end of the second waveguide arm 35 are connected to the end section 36d of the second optical coupler 36. The mesa widths of the first waveguide arm 34 and the second waveguide arm 35 are, for example, about 1.5 µm.

The second optical coupler 36 has a high-mesa waveguide structure. At its end section 36d, the second optical coupler 36 is connected to the first waveguide arm 34 and the second waveguide arm 35. At its other end section 36e, the second optical coupler 36 is connected to the third I/O waveguide 37 and the fourth I/O waveguide 38. For example, the second optical coupler 36 is a MMI coupler. The mesa width of the second optical coupler 36 is, for example, about 10 µm. The length of the second optical coupler 36 along the direction A is, for example, about 200 µm. The wavelength selectivity and the coupling efficiency of the second optical coupler 36 also greatly depend on the mesa width and the length of the second optical coupler 36 along the direction A. In order to obtain high coupling efficiency at specific wavelengths, the mesa width of the second optical coupler 36 and the length of the second optical coupler 36 along the direction A need to be controlled with an accuracy of about ±50 nm.

The third I/O waveguide 37 and the fourth I/O waveguide 38 have a high-mesa waveguide structure, and extend along the direction A from the end section 36e of the second optical coupler 36 to the end section 1e. That is, one end of the third I/O waveguide 37 and one end of the fourth I/O waveguide 38 are connected to the end section 36e of the second optical coupler 36. Further, the other end of the third I/O waveguide 37 and the other end of the fourth I/O waveguide 38 are connected to the end section 1e. The mesa widths of the third I/O waveguide 37 and the fourth I/O waveguide 38 are, for example, about 1.5 µm.

Above the first region 1a, a buried layer 18 is provided so as to cover the first I/O waveguide 31, the second I/O waveguide 32, the first optical coupler 33, the optical waveguide section 34a and the optical waveguide section 35a. Above the second region 1b, the buried layer 18 is provided so as to bury both side surfaces of the phase control section 34b and the phase control section 35b. A first upper electrode E11 is provided on the phase control section 34b, and a second upper electrode E12 is provided on the phase control section 35b. Above the third region 1c, the buried layer 18 is provided so as to cover the optical waveguide section 34c, the optical waveguide section 35c, the second optical coupler 36, the third I/O waveguide 37 and the fourth I/O waveguide 38.

Figure 2A:
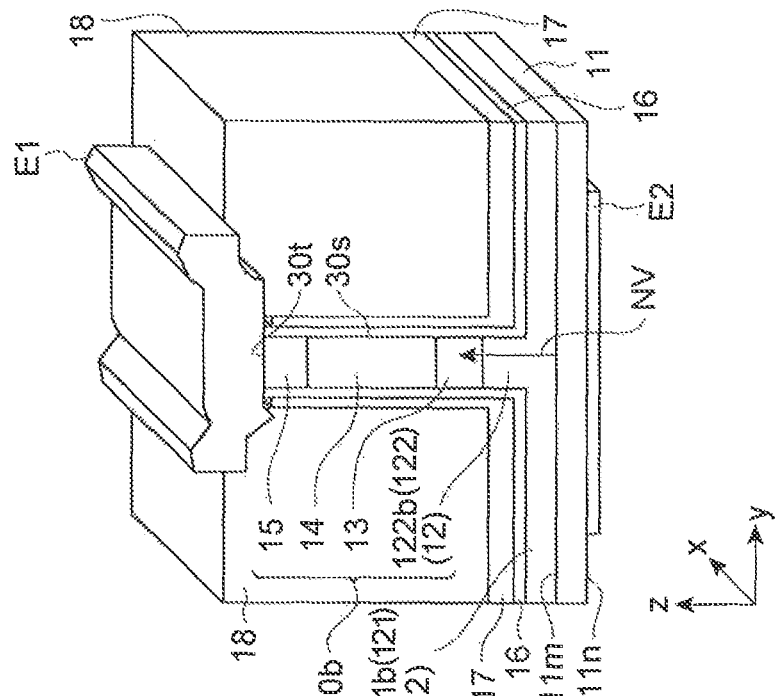
FIG. 2A is a cross sectional perspective view along the line IIa-IIa of the semiconductor Mach-Zehnder modulator of FIG. 1.
Figure 2B:
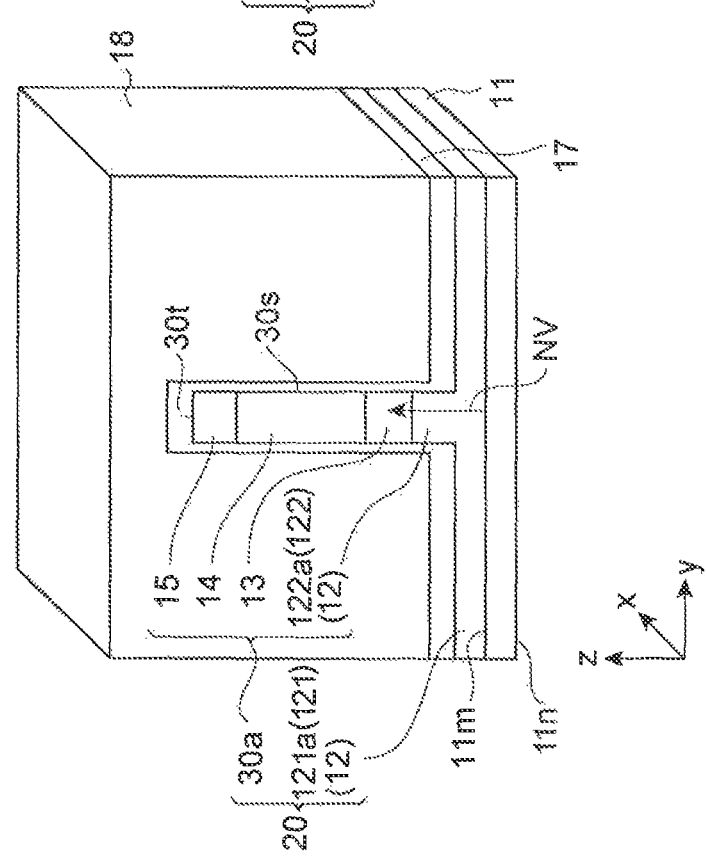
FIG. 2B is a cross sectional perspective view along the line IIb-IIb of the semiconductor Mach-Zehnder modulator of FIG. 1.

FIG. 2A is a perspective view schematically illustrating a cross section along the line IIa-IIa of the semiconductor Mach-Zehnder modulator 1 of FIG. 1. FIG. 2B is a perspective view schematically illustrating a cross section along the line IIb-IIb of the semiconductor Mach-Zehnder modulator 1 of FIG. 1. The cross section illustrated in FIG. 2A is that of a portion including the first I/O waveguide 31. Similar cross sectional structures are possessed by portions including the second I/O waveguide 32, the first optical coupler 33, the optical waveguide section 34a and the optical waveguide section 35a, as well as by portions including the optical waveguide section 34c, the optical waveguide section 35c, the second optical coupler 36, the third I/O waveguide 37 and the fourth I/O waveguide 38. The cross section illustrated in FIG. 2B is that of a portion including the phase control section 34b. A similar cross sectional structure is possessed by a portion including the phase control section 35b. Thus, in the following description, the high-mesa waveguide structure on the first region 1a (namely, the first I/O waveguide 31, the second I/O waveguide 32, the first optical coupler 33, the optical waveguide section 34a and the optical waveguide section 35a) will be described as waveguide mesa 30a, and the high-mesa waveguide structure on the second region 1b (namely, the phase control section 34b and the phase control section 35b) will be described as waveguide mesa 30b. The high-mesa waveguide structure on the third region 1c (namely, the third I/O waveguide 37, the fourth I/O waveguide 38, the second optical coupler 36, the optical waveguide section 34c and the optical waveguide section 35c) will be described as waveguide mesa 30c.

As illustrated in FIGS. 2A and 2B, the semiconductor Mach-Zehnder modulator 1 includes a substrate 11, a stacked semiconductor layer 20, a semiconductor protective layer 16, an insulator protective layer 17, a buried layer 18, upper electrodes E1 and a lower electrode E2. The semiconductor protective layer 16 is a first protective layer in this embodiment. The insulator protective layer 17 is a second protective layer in this embodiment. As already described, the substrate 11 has a main surface 11m and a back surface 11n opposite to the main surface 11m. The substrate 11 includes a first region 1a, a second region 1b and a third region 1c. These first region 1a, second region 1b and third region 1c are arranged sequentially along the direction A that intersects with the normal vector NV of the main surface 11m of the substrate 11. For example, the substrate 11 is composed of n-type InP. The stacked semiconductor layer 20 is provided on the main surface 11m of the substrate 11, and has a high-mesa waveguide structure. The stacked semiconductor layer 20 includes a buffer layer 12, a core layer 13, a cladding layer 14 and a contact layer 15. The buffer layer 12 constitutes a lower cladding layer, and the cladding layer 14 constitutes an upper cladding layer in the embodiment. The substrate 11 may also serve as the lower cladding layer. Light propagates through the core layer 13 disposed between the buffer layer 12 and the cladding layer 14. That is, the stacked semiconductor layer 20 constitutes a waveguide mesa structure in the embodiment. These buffer layer 12, core layer 13, cladding layer 14 and contact layer 15 are arranged sequentially along the normal vector NV of the main surface 11m of the substrate 11. The direction A is a direction intersecting with the normal vector NV, for example, a direction perpendicular to the normal vector NV.

The buffer layer 12 is provided on the main surface 11m of the substrate 11. For example, the buffer layer 12 is composed of n-type InP. The buffer layer 12 includes a flat section 121 and a mesa section 122. The flat section 121 is provided on the substrate 11. Above the first region 1a, the mesa section 122a is provided on the flat section 121a correspondingly to the first I/O waveguide 31, the second I/O waveguide 32, the first optical coupler 33, the optical waveguide section 34a and the optical waveguide section 35a. Above the second region 1b, the mesa section 122b is provided on the flat section 121b correspondingly to the phase control section 34b and the phase control section 35b. Above the third region 1c, the mesa section 122c is provided on the flat section 121c correspondingly to the optical waveguide section 34c, the optical waveguide section 35c, the second optical coupler 36, the third I/O waveguide 37 and the fourth I/O waveguide 38.

The core layer 13 is provided on the mesa section 122 of the buffer layer 12. The core layer 13 has a multilayer quantum well structure including a non-doped well layer and a non-doped barrier layer. The well layer is composed of, for example, GaInAsP or AlGaInAs. The barrier layer is composed of, for example, GaInAsP, AlGaInAs, or AlInAs. The thickness of the core layer 13 is, for example, about 500 nm. The cladding layer 14 is provided on the core layer 13. For example, the cladding layer 14 is composed of p-type InP. The thickness of the cladding layer 14 is, for example, about 1.5 µm. The contact layer 15 is provided on the cladding layer 14. For example, the contact layer 15 is composed of $p^+$-type GaInAs. The thickness of the contact layer 15 is, for example, about 300 nm.

The mesa section 122, the core layer 13, the cladding layer 14 and the contact layer 15 are sequentially stacked on the flat section 121 to form waveguide mesas 30a, 30b and 30c. That is, the waveguide mesas 30a, 30b and 30c include the first I/O waveguide 31, the second I/O waveguide 32, the first optical coupler 33, the first waveguide arm 34, the second waveguide arm 35, the second optical coupler 36, the third I/O waveguide 37 and the fourth I/O waveguide 38. The first I/O waveguide 31, the second I/O waveguide 32, the first optical coupler 33, the optical waveguide section 34a and the optical waveguide section 35a are provided on the first region 1a of the substrate 11 (namely, the substrate 11a). The phase control section 34b and the phase control section 35b are provided on the second region 1b of the substrate 11 (namely, the substrate 11b). The optical waveguide section 34c, the optical waveguide section 35c, the second optical coupler 36, the third I/O waveguide 37 and the fourth I/O waveguide 38 are provided on the third region 1c of the substrate 11 (namely, the substrate 11c).

Above the second region 1b, the semiconductor protective layer 16 is provided on the side surfaces 30s of the waveguide mesa 30b. For example, the semiconductor protective layer 16 is composed of non-doped InP. In this embodiment, the semiconductor protective layer 16 is also provided on the flat section 121b above the second region 1b. On the side surfaces 30s of the waveguide mesa 30b, the thickness of the semiconductor protective layer 16 is, for example, not less than 200 nm and not more than 300 nm. The semiconductor protective layer 16 is composed of a material having a high resistivity. The semiconductor protective layer 16 may be composed of a semi-insulating semiconductor such as Fe-doped InP.

The insulator protective layer 17 is provided so as to cover the stacked semiconductor layer 20, and is composed of, for example, a dielectric film including at least one of a silicon dioxide ($SiO_2$) film and a silicon nitride (SiN) film. Above the first region 1a and the third region 1c, the insulator protective layer 17 is provided between the stacked semiconductor layer 20 (waveguide mesas 30a and 30c) and the buried layer 18, and in contact with the stacked semiconductor layer 20 (waveguide mesas 30a and 30c) and the buried layer 18. Above the second region 1b, the insulator protective layer 17 is provided between the semiconductor protective layer 16 and the buried layer 18, and in contact with the semiconductor protective layer 16 and the buried layer 18. The thickness of the insulator protective layer 17 is, for example, about 300 nm. The insulator protective layer 17 has openings 17d on the phase control section 34b of the first waveguide arm 34 and on the phase control section 35b of the second waveguide arm 35.

The buried layer 18 is provided on the insulator protective layer 17 so as to cover the waveguide mesas 30a, 30b and 30c. The buried layer 18 is composed of a low-dielectric film. The buried layer 18 has a dielectric constant lower than that of the semiconductor protective layer 16. For example, the buried layer 18 is composed of a benzocyclobutene (BCB) resin. Above the first region 1a, the buried layer 18 is provided so as to cover the first I/O waveguide 31, the second I/O waveguide 32, the first optical coupler 33, the optical waveguide section 34a and the optical waveguide section 35a. Above the second region 1b, the buried layer 18 is provided so as to cover both the side surfaces 30s of the phase control section 34b and the phase control section 35b. Above the third region 1c, the buried layer 18 is provided so as to cover the optical waveguide section 34c, the optical waveguide section 35c, the second optical coupler 36, the third I/O waveguide 37 and the fourth I/C) waveguide 38. The buried layer 18 has an opening 18d on the phase control section 34b of the first waveguide arm 34, and an opening 18d on the phase control section 35b of the second waveguide arm 35.

The upper electrodes E1 are provided on the waveguide mesa 30b above the second region 1b. That is, the upper electrodes E1 include a first upper electrode E11 in contact with the phase control section 34b of the first waveguide arm 34, and a second upper electrode E12 in contact with the phase control section 35b of the second waveguide arm 35. The first upper electrode E11 is in contact with the phase control section 34b (the contact layer 15) via the opening 18d (the first opening). The second upper electrode E12 is in contact with the phase control section 35b (the contact layer 15) via the opening 18d (the second opening). For example, the upper electrodes E1 are composed of Ti/Pt/Au. Below the second region 1b, the lower electrode E2 is provided on the back surface 11n of the substrate 11. For example, the lower electrode E2 is composed of AuGeNi/Au.

According to the semiconductor Mach-Zehnder modulator 1 described above, the semiconductor protective layer 16 is provided, above the second region 1b, on the side surfaces 30s of the phase control section 34b of the first waveguide arm 34 as well as on the side surfaces 30s of the phase control section 35b of the second waveguide arm 35. Further, the first upper electrode E11 is provided on the phase control section 34b of the first waveguide arm 34, and the second upper electrode E12 is provided on the phase control section 35b of the second waveguide arm 35. Furthermore, the lower electrode E2 is provided on the back surface 11n of the substrate 11. According to this configuration, the semiconductor protective layer 16 allows for reducing the leakage current at the side surfaces 30s of the phase control section 34b when a voltage is applied between the first upper electrode E11 and the lower electrode E2. Further, the semiconductor protective layer 16 allows for reducing the leakage current at the side surfaces 30s of the phase control section 35b when a voltage is applied between the second upper electrode E12 and the lower electrode E2. As a result, the phase control section 34b of the first waveguide arm 34 and the phase control section 35b of the second waveguide arm 35 achieve improved accuracy in controlling optical phases. Thus, long-term reliability under the application of voltage is stabilized. The lower electrode E2 may be provided on the second region 1b of the back surface 11n of the substrate 11, or on the entirety of the back surface 11n.

Semiconductor Mach-Zehnder modulators are required to be capable of very fast modulation. It is thus necessary that the parasitic capacitance in the high-mesa waveguide structure be reduced. The semiconductor Mach-Zehnder modulator 1 deals with this problem by adopting the configuration in which the buried layer 18 composed of a material such as a BCB resin is provided on the semiconductor protective layer 16 above the second region 1b so as to cover the side surfaces 30s of the phase control section 34b of the first waveguide arm 34 and of the phase control section 35b of the second waveguide arm 35. The buried layer 18 has a lower dielectric constant than semi-insulating semiconductors. Accordingly, the parasitic capacitance of the phase control section 34b and the phase control section 35b can be reduced as compared to the structure in which the phase control section 34b of the first waveguide arm 34 and the phase control section 35b of the second waveguide arm 35 are buried with a semi-insulating semiconductor.

In the semiconductor Mach-Zehnder modulator 1, further, the insulator protective layer 17 is provided above the first region 1a between the stacked semiconductor layer 20 and the buried layer 18. Above the second region 1b, the insulator protective layer 17 is provided between the semiconductor protective layer 16 and the buried layer 18. Above the third region 1c, the insulator protective layer 17 is provided between the stacked semiconductor layer 20 and the buried layer 18. According to this configuration, improved adhesion is achieved between the stacked semiconductor layer 20 and the buried layer 18 above the first region 1a and the third region 1c, as well as between the semiconductor protective layer 16 and the buried layer 18 above the second region 1b. Thus, it becomes possible to prevent the detachment of the buried layer 18 composed of a material such as a BCB resin from the stacked semiconductor layer 20 or the semiconductor protective layer 16. Because the detachment of the buried layer 18 is prevented, the consequent exposure of the waveguide mesas 30a, 30b and 30c and deteriorations in reliability are also prevented. Furthermore, due to the detachment of the buried layer 18, a step is formed in the phase control section 34b or the phase control section 35b. Such steps result in the breakage of the electrode metal. However, the above configuration according to the invention can suppress the occurrence of such problems.

In the semiconductor Mach-Zehnder modulator 1, the thickness of the semiconductor protective layer 16 is not less than 200 nm and not more than 300 nm. This configuration allows for reducing the leakage current at the side surfaces 30s of the phase control section 34b of the first waveguide arm 34 as well as at the side surfaces 30s of the phase control section 35b of the second waveguide arm 35. In addition, it is possible to suppress parasitic capacitance of the phase control section 34b and the phase control section 35b.

In the semiconductor Mach-Zehnder modulator 1, no semiconductor protective layer 16 is provided on the side surfaces 30s of the waveguide mesa 30a or the side surfaces 30s of the waveguide mesa 30c above the first region 1a and the third region 1c. Above the first region and the third region, the waveguide mesa including the first and second optical couplers 33 and 36 has the side surfaces 30s without the first protective layer. That is, the insulator protective layer 17 is in contact with the side surfaces 30s of the waveguide mesa 30a and the side surfaces 30s of the waveguide mesa 30c, with the buried layer 18 being provided on the insulator protective layer 17. The insulator protective layer 17 has a smaller refractive index than that of the semiconductor protective layer 16. According to this configuration, the side surfaces 30s of the waveguide mesas 30a and 30c are covered with the insulator protective layer 17. The difference of the refractive indices between the insulator protective layer 17 and the waveguide mesas 30a and 30c is relatively larger as compared to the structure in which the side surfaces 30s of the waveguide mesas 30a and 30c are covered with the semiconductor layer such as the semiconductor protective layer 16. In the embodiment, the light propagating in the waveguide mesas is strongly confined in the waveguide mesas 30a and 30c on the first region 1a and the third region 1c. As a result, the first optical coupler 33 and the second optical coupler 36 can achieve high coupling efficiency.

The semiconductor Mach-Zehnder modulator 1 according to the present invention is not limited to the configurations described in the above embodiment. For example, the first optical coupler 33 and the second optical coupler 36 are illustrated as being MMI couplers in the above embodiment, but they may be directional couplers.

Figure 3:
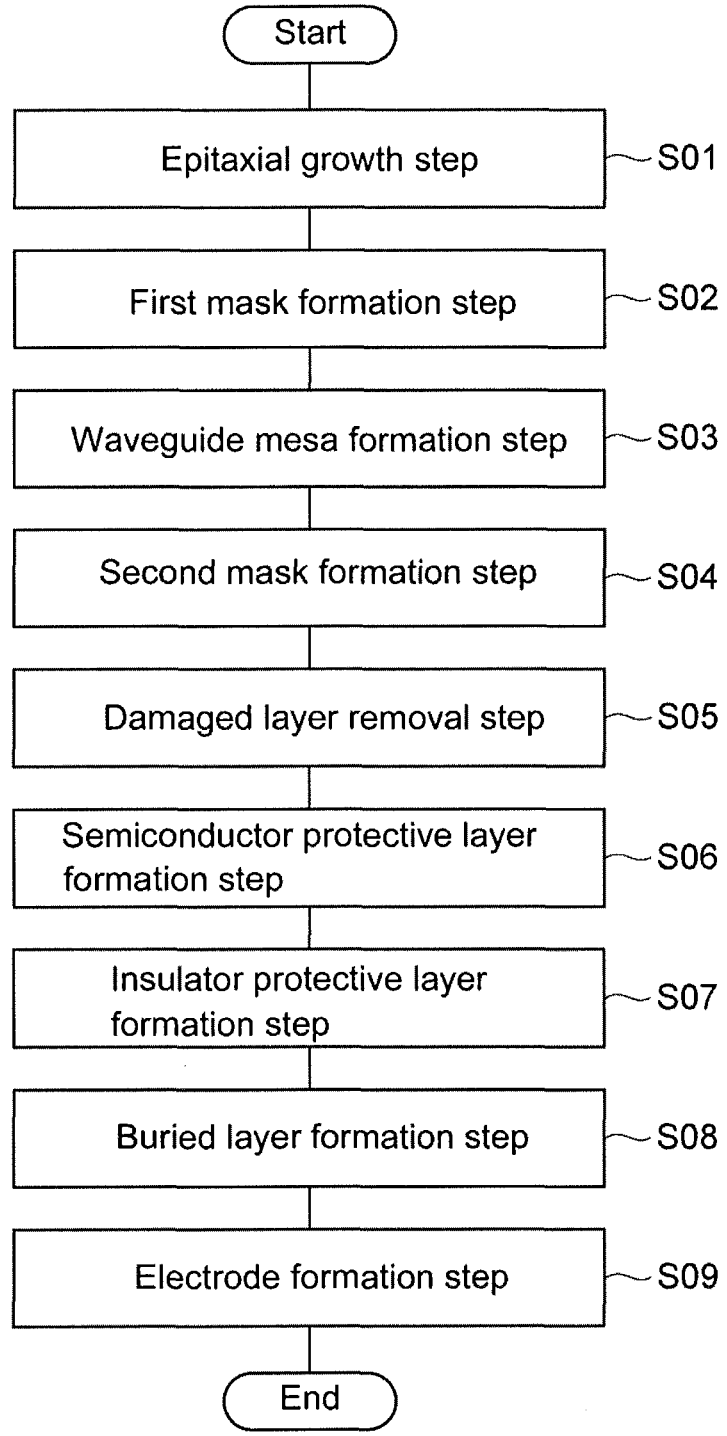
FIG. 3 is a process chart illustrating an exemplary method for manufacturing the semiconductor Mach-Zehnder modulator of FIG. 1.

Next, an example of methods for manufacturing semiconductor Mach-Zehnder modulators 1 will be described with reference to FIG. 3. FIG. 3 is a process chart illustrating a method for manufacturing semiconductor Mach-Zehnder modulators 1. As illustrated in FIG. 3, a method for manufacturing semiconductor Mach-Zehnder modulators 1 includes an epitaxial growth step S01, a first mask formation step S02, a waveguide mesa formation step S03, a second mask formation step S04, a damaged layer removal step S05, a semiconductor protective layer formation step S06, an insulator protective layer formation step S07, a buried layer formation step S08, and an electrode formation step S09.

In the epitaxial growth step S01, a stacked semiconductor layer 20 is grown on a main surface 11m of a substrate 11. The epitaxial growth step S01 will be described in detail with reference to FIGS. 4A and 4B. FIG. 4A is a perspective view schematically illustrating a cross section in the epitaxial growth step S01 as viewed along the line IIa-IIa in FIG. 1. FIG. 4B is a perspective view schematically illustrating a cross section in the epitaxial growth step S01 as viewed along the line IIb-IIb in FIG. 1. As illustrated in FIGS. 4A and 4B, a buffer layer 12, a core layer 13, a cladding layer 14 and a contact layer 15 are epitaxially grown in this order on the main surface 11m of the substrate 11 along the normal vector NV of the main surface 11m of the substrate 11 by using a crystal growth apparatus such as an organometallic vapor phase epitaxy (OMVPE) apparatus.

Figure 5A:
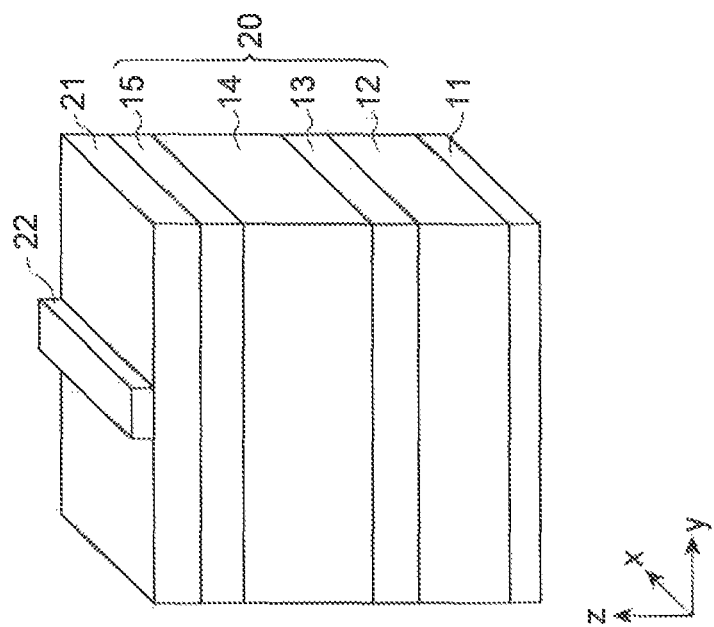
FIGS. 5A and 5B illustrate a step for manufacturing the semiconductor Mach-Zehnder modulator in the method of FIG. 3.
Figure 5B:
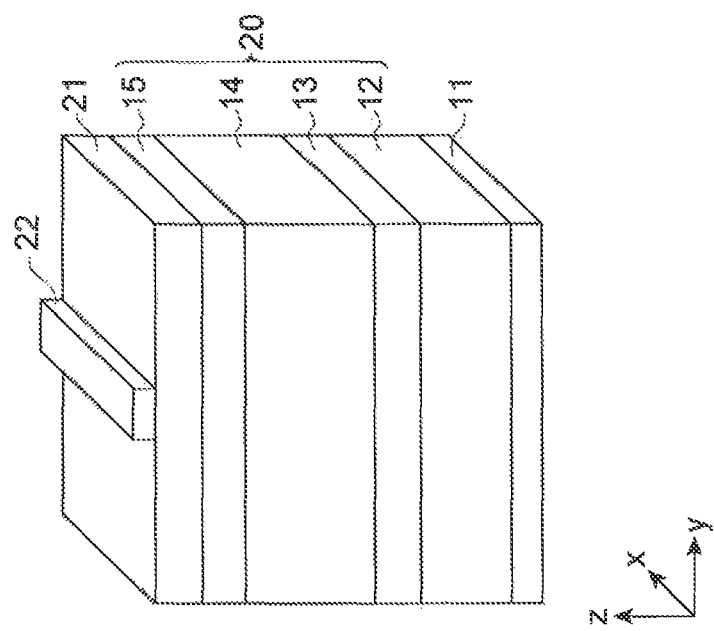

In the first mask formation step S02, a first mask M1 for forming waveguide mesas 30a, 30b and 30c are formed on the stacked semiconductor layer 20. The first mask formation step S02 will be described in detail with reference to FIGS. 5A to 7. FIGS. 5A and 6A are perspective views schematically illustrating a cross section in the first mask formation step S02 as viewed along the line IIa-IIa in FIG. 1. FIGS. 5B and 6B are perspective views schematically illustrating a cross section in the first mask formation step S02 as viewed along the line IIb-IIb in FIG. 1. FIG. 7 is a plan view schematically illustrating a first mask M1 formed in the first mask formation step S02.

First, as illustrated in FIGS. 5A and 5B, a first insulating layer 21 is formed on the stacked semiconductor layer 20 (the contact layer 15) by a chemical vapor deposition (CVD) method. For example, this first insulating layer 21 is composed of $SiO_2$ and has a thickness of about 300 nm. A resist pattern 22 is formed with a Mach-Zehnder type stripe pattern on the first insulating layer 21 using a photolithography method so as to cover a region of the first insulating layer 21 corresponding to waveguide mesas 30a, 30b and 30c. The first insulating layer 21 is etched by, for example, $CF_4$ reactive ion etching (RIE) using the resist pattern 22 as an etching mask, thus forming a first insulating layer mask (not illustrated). Further, as illustrated in FIGS. 6A and 6B, the resist pattern 22 is removed, thus forming a first mask M1 including the first insulating layer mask. As illustrated in FIG. 7, the first mask M1 is formed so as to cover a portion of the stacked semiconductor layer 20 in which waveguide mesas 30a, 30b and 30c will be formed.

Figure 8A:
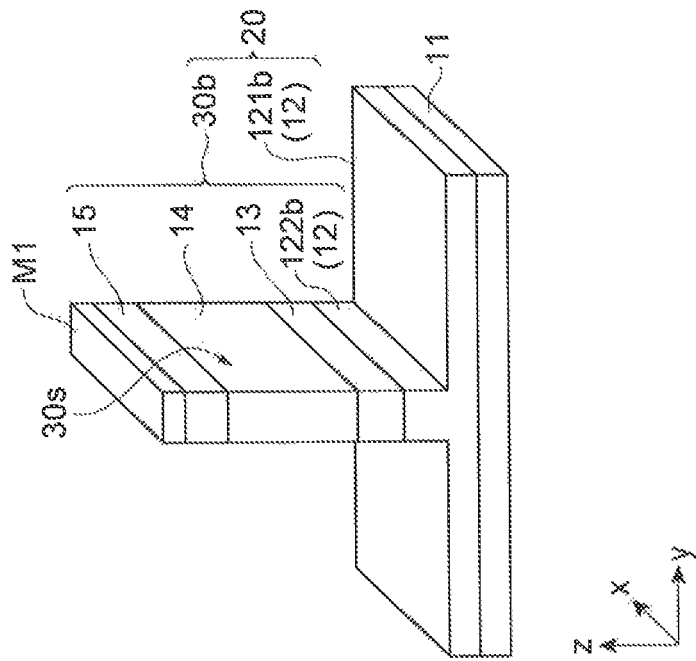
FIGS. 8A and 8B illustrate a step for manufacturing the semiconductor Mach-Zehnder modulator in the method of FIG. 3.
Figure 8B:
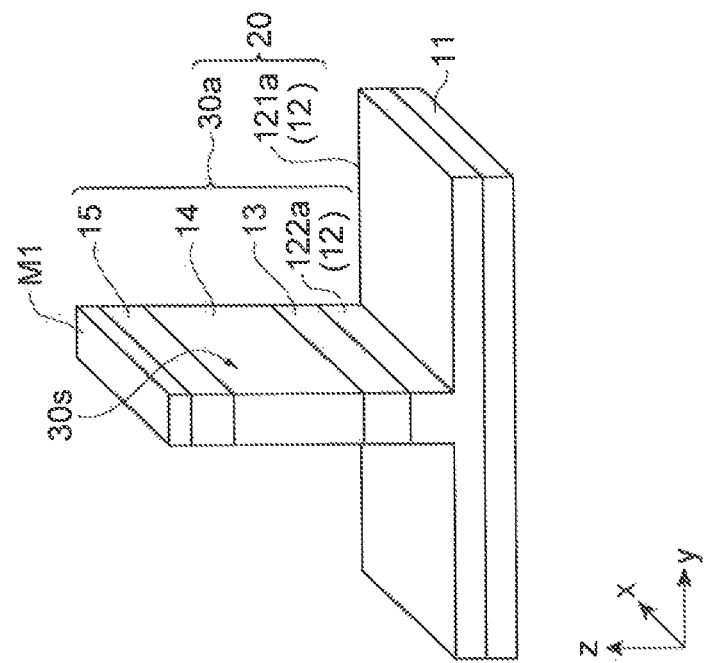

In the waveguide mesa formation step S03, the stacked semiconductor layer 20 is etched using the first mask M1 as an etching mask, thus forming waveguide mesas 30a, 30b and 30c. The waveguide mesa formation step S03 will be described in detail with reference to FIGS. 8A and 8B. FIG. 8A is a perspective view schematically illustrating a cross section in the waveguide mesa formation step S03 as viewed along the line IIa-IIa in FIG. 1. FIG. 8B is a perspective view schematically illustrating a cross section in the waveguide mesa formation step S03 as viewed along the line IIb-IIb in FIG. 1. As illustrated in FIGS. 8A and 8B, the contact layer 15, the cladding layer 14, the core layer 13 and the buffer layer 12 are etched sequentially by, for example, $Cl_2$-based reactive ion etching (RIE) to form waveguide mesas 30a, 30b and 30c of the stacked semiconductor layer 20.

In this manner, the stacked semiconductor layer 20 is processed into the waveguide mesas 30a, 30b and 30c in the waveguide mesa formation step S03. The waveguide mesas 30a, 30b and 30c include a first I/O waveguide 31, a second I/O waveguide 32, a first optical coupler 33, an optical waveguide section 34a and an optical waveguide section 35a on the first region 1a, a phase control section 34b and a phase control section 35b on the second region 1b, and an optical waveguide section 34c, an optical waveguide section 35c, a second optical coupler 36, a third I/O waveguide 37 and a fourth I/O waveguide 38 on the third region 1c.

Figure 10A:
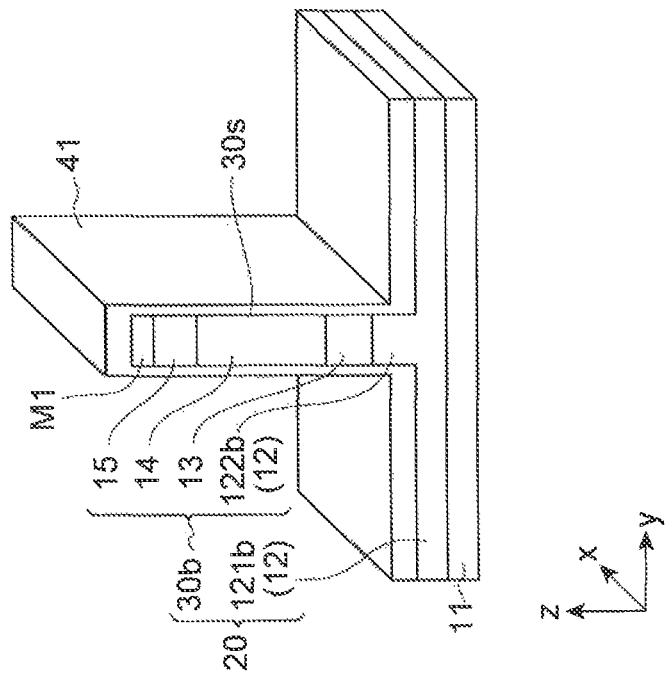
FIGS. 10A and 10B illustrate a step for manufacturing the semiconductor Mach-Zehnder modulator in the method of FIG. 3.
Figure 10B:
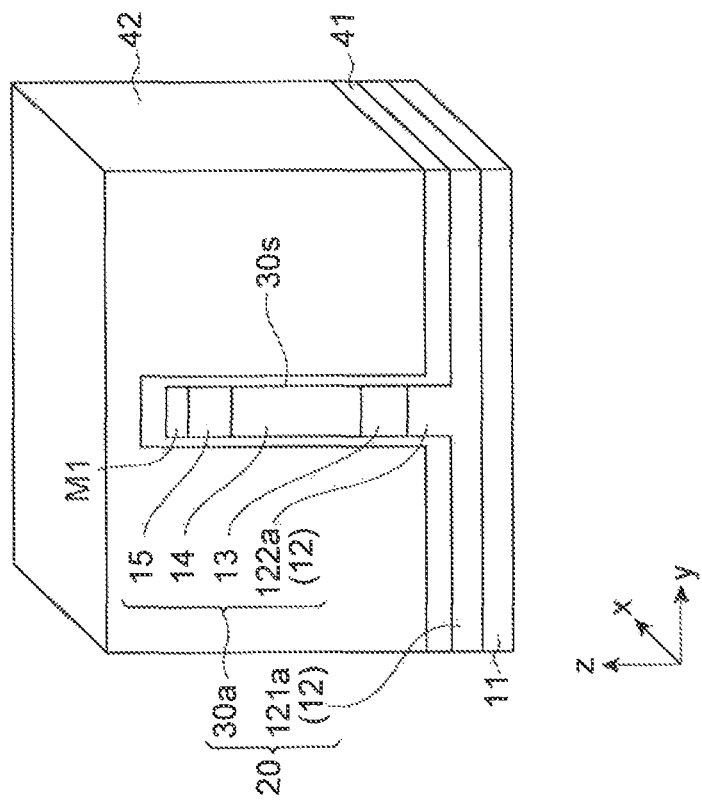
Figure 11:
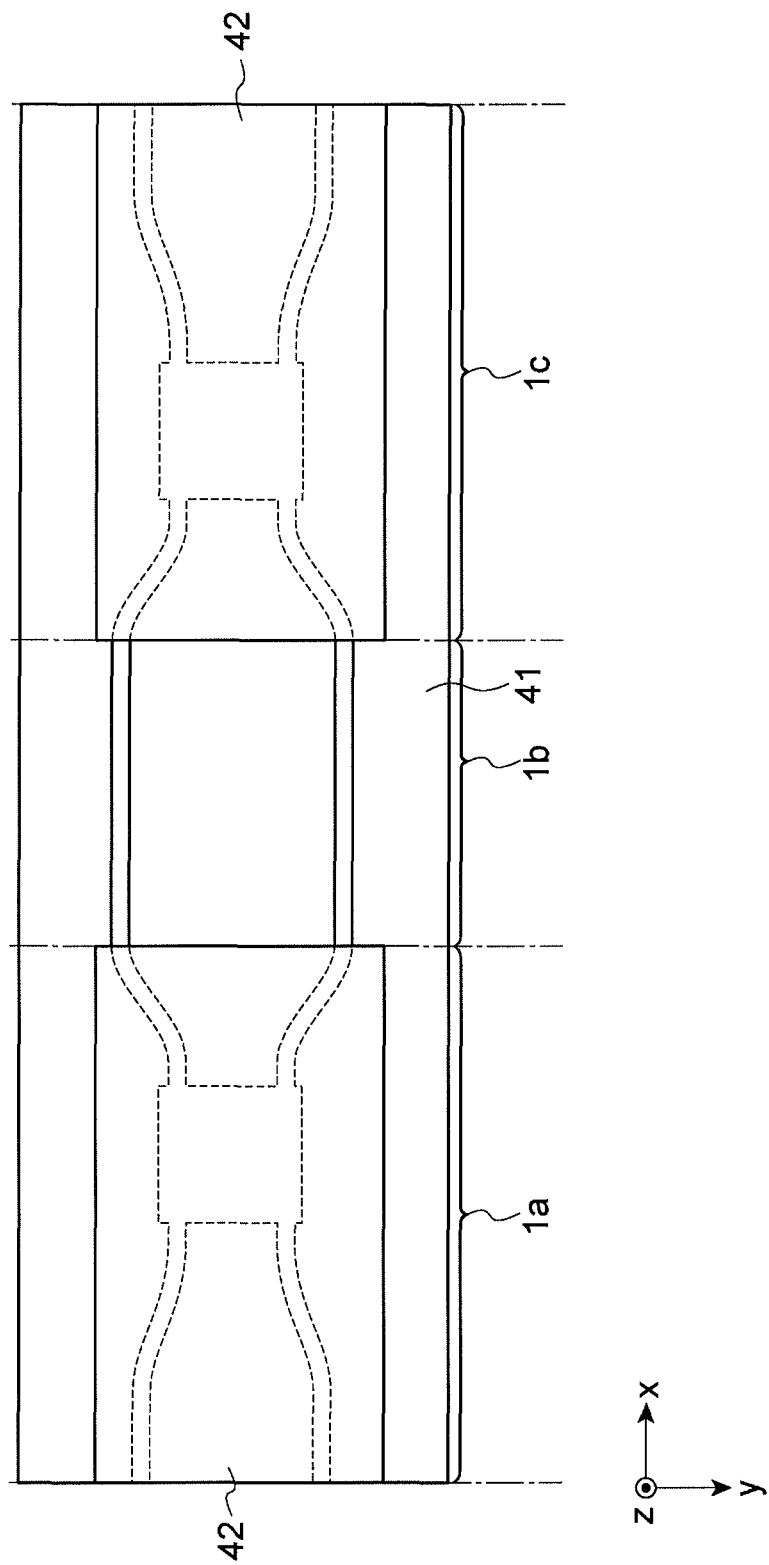
FIG. 11 is a plan view schematically illustrating a resist pattern formed in the course of the method of FIG. 3.
Figure 12A:
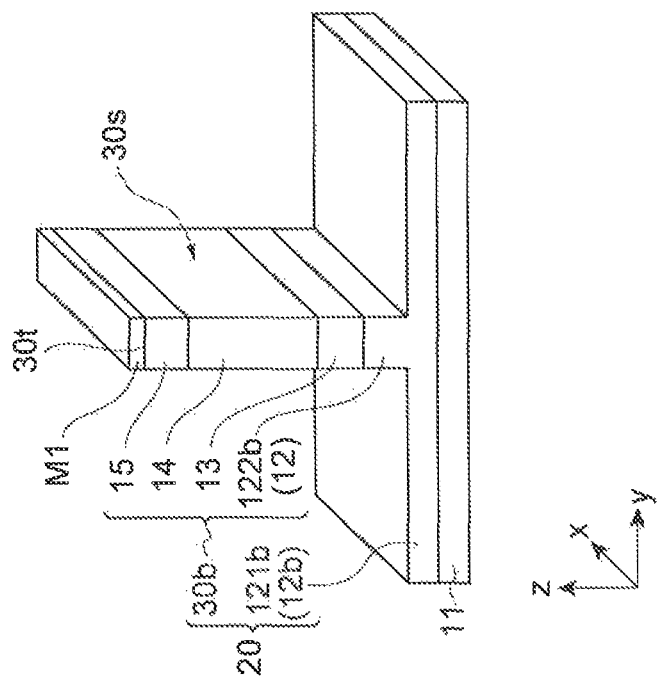
FIGS. 12A and 12B illustrate a step for manufacturing the semiconductor Mach-Zehnder modulator in the method of FIG. 3.
Figure 12B:
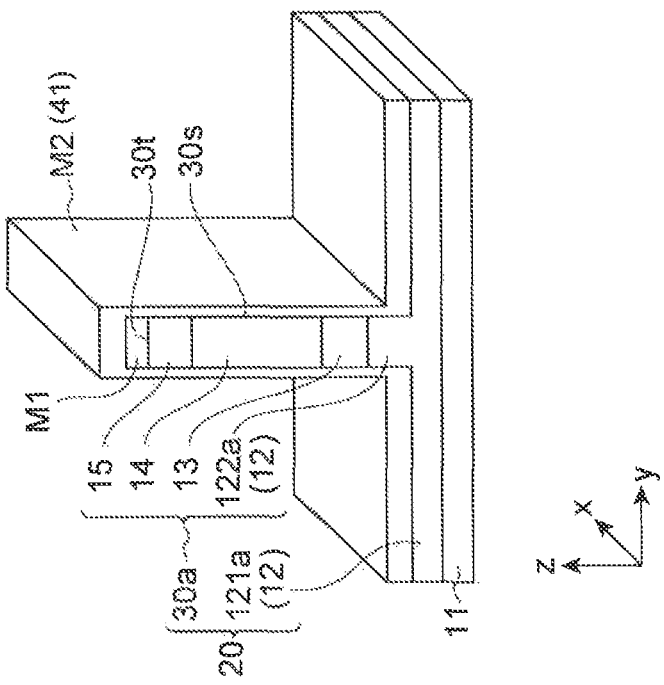
Figure 13:
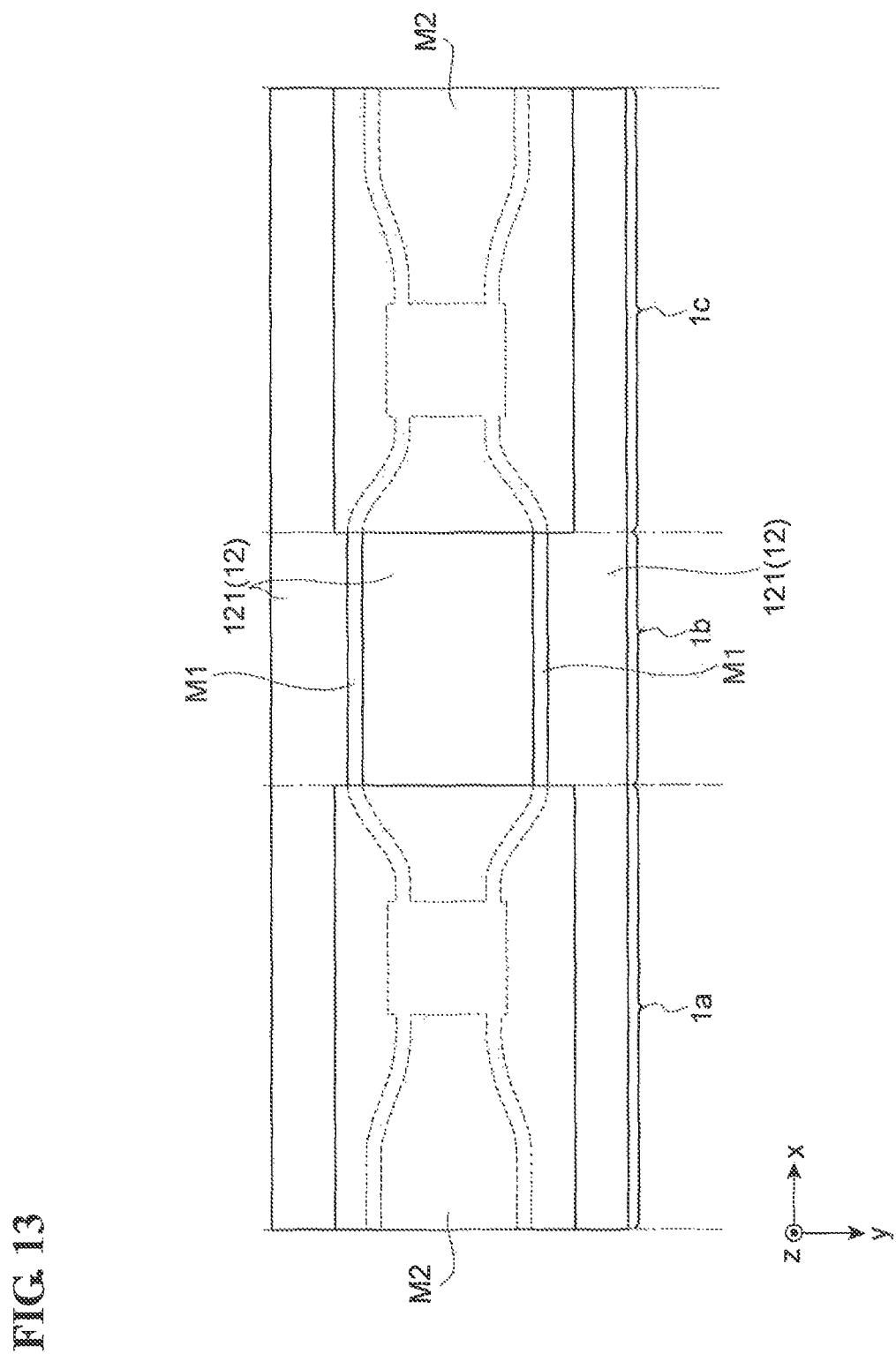
FIG. 13 is a plan view schematically illustrating a second mask.

In the second mask formation step S04, a second mask M2 for protecting the waveguide mesas 30a and 30c on the first region 1a and the third region 1c is formed on the stacked semiconductor layer 20 that has been processed in the waveguide mesa formation step S03. The second mask formation step S04 will be described with reference to FIGS. 9A to 13. FIGS. 9A, 10A and 12A are perspective views schematically illustrating a cross section in the second mask formation step S04 as viewed along the line IIa-IIa in FIG. 1. FIGS. 9B, 10B and 12B are perspective views schematically illustrating a cross section in the second mask formation step S04 as viewed along the line IIb-IIb in FIG. 1. FIG. 11 is a plan view illustrating a resist pattern formed in the course of the second mask formation step S04. FIG. 13 is a plan view illustrating a second mask M2 formed in the second mask formation step S04.

First, as illustrated in FIGS. 9A and 9B, a second insulating layer 41 is formed by a CVD method on the stacked semiconductor layer 20 which has been processed in the waveguide mesa formation step S03 and on which the first mask M1 is left without being removed. For example, the second insulating layer 41 is composed of SiN and has a thickness of about 200 nm. Further, as illustrated in FIGS. 10A, 10B and 11, a resist pattern 42 is formed on the stacked semiconductor layer 20 on which the second insulating layer 41 has been formed using a photolithography method. This resist pattern 42 is provided above the first region 1a and the third region 1c, and is not provided above the second region 1b. Above the first region 1a and the third region 1c, the resist pattern 42 is provided so as to bury the waveguide mesa 30a and the waveguide mesa 30c.

Next, as illustrated in FIGS. 12A and 12B, the second insulating layer 41 is removed by buffered hydrofluoric acid (BHF) treatment using the resist pattern 42 as a mask, thus forming a second insulating layer mask (not illustrated). Because any resist pattern 42 is not provided above the second region 1b, the second insulating layer 41 above the second region 1b is removed. The BHF treatment is terminated when the second insulating layer 41 is removed from the side surfaces 30s of the waveguide mesa 30b as well as from the flat section 121b of the buffer layer 12. As a result, the first mask M1 remains on the waveguide mesa 30b (on the contact layer 15). Thereafter, the resist pattern 42 is removed with an organic solvent, thus forming a second mask M2 including the second insulating layer mask. In this embodiment, the second insulating layer 41 is composed of SiN and the first mask M1 (the first insulating layer 21) is composed of $SiO_2$. In the BHF treatment, the SiN can be etched at a higher etching rate than the $SiO_2$. Thus, this combination easily ensures that the BHF treatment can be terminated while the second insulating layer 41 is removed but the first mask M1 still remains on the waveguide mesa 30b (on the contact layer 15).

Alternatively, the first insulating layer 21 may be a dielectric film composed of a material such as SiN. Still alternatively, the second insulating layer 41 may be a dielectric film composed of a material such as $SiO_2$. The first insulating layer 21 and the second insulating layer 41 have sufficient thickness. Accordingly, by appropriately controlling the etching rates and the etching time, the BHF treatment can be easily terminated when the second insulating layer 41 is removed from the side surfaces 30s of the waveguide mesa 30b as well as from the flat section 121b of the buffer layer 12 above the second region 1-b even when the first insulating layer 21 and the second insulating layer 41 are composed of the same material, or even when the first insulating layer 21 and the second insulating layer 41 are composed of materials having only a small difference in etching rates. At the termination, the first mask M1 remains on the waveguide mesa 30b (on the contact layer 15) above the second region 1b.

As illustrated in FIG. 13, above the first region 1a, the second mask M2 is provided so as to cover the first I/O waveguide 31, the second I/O waveguide 32, the first optical coupler 33, the optical waveguide section 34a and the optical waveguide section 35a. Further, above the third region 1c, the second mask M2 is provided so as to cover the optical waveguide section 34c, the optical waveguide section 35c, the second optical coupler 36, the third I/O waveguide 37 and the fourth I/O waveguide 38. Above the second region 1b, the first mask M1 has been provided so as to cover a top surface 30t of the phase control section 34b and a top surface 30t of the phase control section 35b, and the second insulating layer mask is not provided on the side surfaces 30s of the phase control section 34b and on the side surfaces 30s of the phase control section 35b.

In the damaged layer removal step S05, the stacked semiconductor layer 20 is etched using the first mask M1 and the second mask M2 as etching masks, thus removing damaged layers (not illustrated) from the stacked semiconductor layer 20 above the second region 1b. Here, the term "damaged layers" refers to damaged layers that have been formed on the side surfaces of the high-mesa waveguide structure during the formation of the high-mesa waveguide structure by dry etching. Thus, such layers are present on the side surfaces 30s of the waveguide mesas 30a, 30b and 30c. Leakage current flows through such damaged layers during modulation. Thus, the presence of damaged layers adversely affects phase control of the semiconductor Mach-Zehnder modulator 1. To eliminate such risks, damaged layers formed on the side surfaces 30s of the waveguide mesa 30b are removed by, for example, HCl-based wet etching while using the first mask M1 and the second mask M2 as etching masks. Because the waveguide mesa 30a and the waveguide mesa 30c are covered by the second mask M2, damaged layers formed on the side surfaces 30s of the waveguide mesa 30a and the waveguide mesa 30c are not removed during this etching. Thus, the removal of damaged layers (wet etching) does not cause a decrease in mesa width (or variations in mesa width) of the waveguide mesa 30a and the waveguide mesa 30c. That is, the waveguide mesa 30a and the waveguide mesa 30c formed in the waveguide mesa formation step S03 maintain their mesa widths (waveguide widths).

Figure 14A:
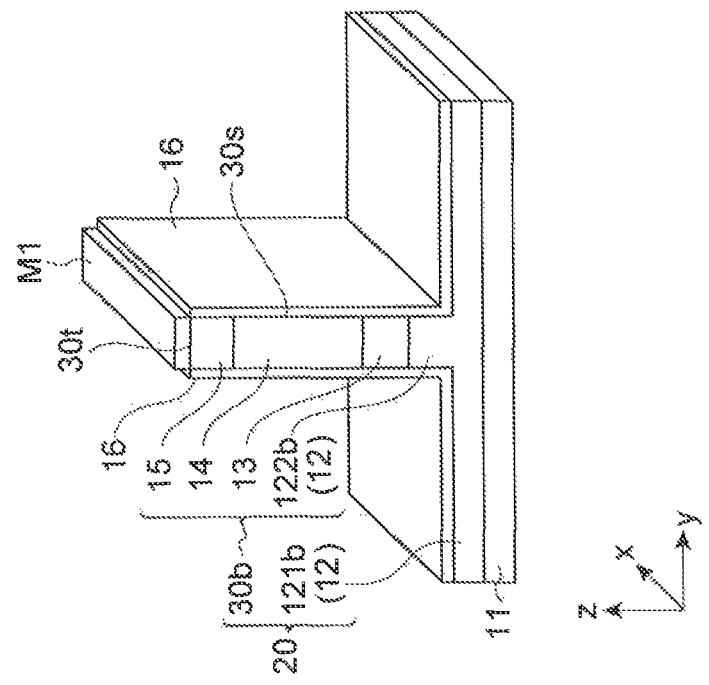
FIGS. 14A and 14B illustrate a step for manufacturing the semiconductor Mach-Zehnder modulator in the method of FIG. 3.
Figure 14B:
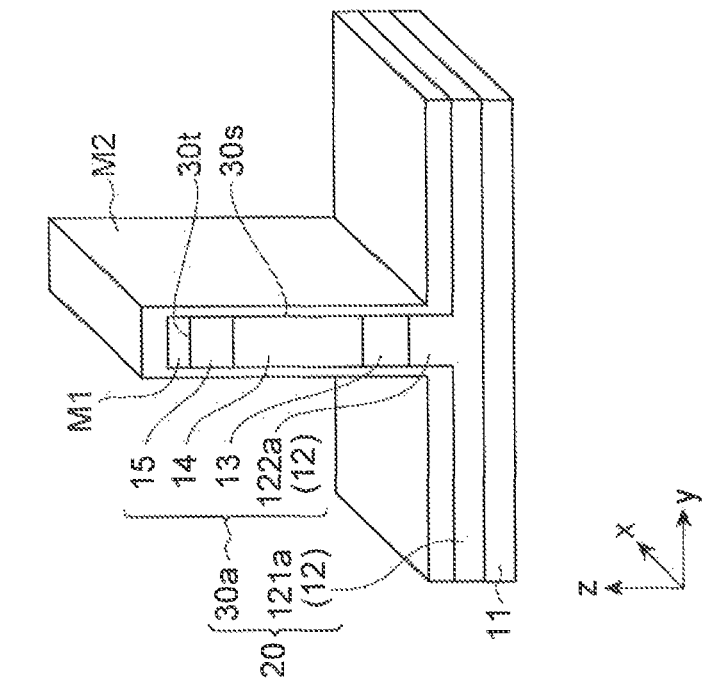

In the semiconductor protective layer formation step S06, a semiconductor protective layer 16 is grown on the side surfaces 30s of the waveguide mesa 30b on the second region 1b that has been processed in the damaged layer removal step S05. The semiconductor protective layer formation step S06 will be described in detail with reference to FIGS. 14A and 14B. FIG. 14A is a perspective view schematically illustrating a cross section in the semiconductor protective layer formation step S06 as viewed along the line IIa-IIa in FIG. 1. FIG. 14B is a perspective view schematically illustrating a cross section in the semiconductor protective layer formation step S06 as viewed along the line IIb-IIb in FIG. 1.

As illustrated in FIGS. 14A and 14B, a semiconductor protective layer 16 is regrown on the stacked semiconductor layer 20 processed in the damaged layer removal step S05, with a crystal growth apparatus such as OMVPE. Here, the thickness of the semiconductor protective layer 16 is controlled to be not more than 300 nm, whereby the regrowth of the semiconductor protective layer 16 does not take place in the regions covered by the second mask M2. That is, the semiconductor protective layer 16 is not formed above the first region 1a and the third region 1c, namely, on the top surfaces 30t and the side surfaces 30s of the waveguide mesa 30a and the waveguide mesa 30c as well as on portions of the main surfaces of the flat section 121a and the flat section 121c in which the second mask M2 has been formed. Above the second region 1b, the semiconductor protective layer 16 is formed on the main surface of the flat section 121b and on the side surfaces 30s of the waveguide mesa 30b, and is not formed on the top surface 30t of the waveguide mesa 30b. The rate of regrowth of the semiconductor protective layer 16 is such that the semiconductor protective layer 16 is uniformly formed on the side surfaces 30s of the waveguide mesa 30b as well as such that impurities do not become attached to the core layer 13. For example, such a regrowth rate is about 250 nm/h to 500 nm/h.

In the insulator protective layer formation step S07, an insulator protective layer 17 for protecting the waveguide mesa 30 is formed on the stacked semiconductor layer 20 processed in the semiconductor protective layer formation step S06. The insulator protective layer formation step S07 will be described in detail with reference to FIGS. 15A and 15B. FIG. 15A is a perspective view schematically illustrating a cross section in the insulator protective layer formation step S07 as viewed along the line IIa-IIa in FIG. 1. FIG. 15B is a perspective view schematically illustrating a cross section in the insulator protective layer formation step S07 as viewed along the line IIb-IIb in FIG. 1.

First, the second mask M2 and the first mask M1 are removed with, for example, hydrofluoric acid. Next, as illustrated in FIGS. 15A and 15B, an insulator protective layer 17 is formed on the stacked semiconductor layer 20 by a CVD method so as to cover the top surfaces 30t and the side surfaces 30s of the waveguide mesa 30a and the waveguide mesa 30c, the main surfaces of the flat section 121a and the flat section 121c, the top surface 30t of the waveguide mesa 30b, and the semiconductor protective layer 16. The insulator protective layer 17 is an insulating layer, for example, a dielectric film composed of a material such as $SiO_2$ or SiN. For example, the thickness thereof is about 300 nm.

In the buried layer formation step S08, a buried layer 18 is formed on the stacked semiconductor layer 20 processed in the insulator protective layer formation step S07, thus planarizing the element. The buried layer formation step S08 will be described in detail with reference to FIGS. 16A and 16B. FIG. 16A is a perspective view schematically illustrating a cross section in the buried layer formation step S08 as viewed along the line IIa-IIa in FIG. 1. FIG. 16B is a perspective view schematically illustrating a cross section in the buried layer formation step S08 as viewed along the line IIb-IIb in FIG. 1. As illustrated in FIGS. 16A and 16B, a buried layer 18 is formed on the insulator protective layer 17 so as to cover the waveguide mesas 30a, 30b and 30c (30c is not illustrated but has the same structure as 30a). The buried layer 18 has low dielectric constant and is composed of, for example, a BCB resin.

In the electrode formation step S09, upper electrodes E1 and lower electrode E2 for phase control are formed on and below the stacked semiconductor layer 20 processed in the buried layer formation step S08. The electrode formation step S09 will be described in detail with reference to FIGS. 17A to 19B. FIGS. 17A, 18A and 19A are perspective views schematically illustrating a cross section in the electrode formation step S09 as viewed along the line IIa-IIa in FIG. 1. FIGS. 17B, 18B and 19B are perspective views schematically illustrating a cross section in the electrode formation step S09 as viewed along the line IIb-IIb in FIG. 1.

First, as illustrated in FIGS. 17A and 17B, a resist pattern 43 is formed on the buried layer 18 using a photolithography method. The resist pattern 43 has openings 43d for the formation of the upper electrodes E1. The openings 43d are provided on the waveguide mesa 30b (the phase control section 34b and the phase control section 35b). The buried layer 18 is etched by reactive ion etching (RIE) using a $CF_4/O_2$ gas mixture while using the resist pattern 43 as an etching mask. The buried layer 18 is etched until the insulator protective layer 17 on the top surface 30t of the waveguide mesa 30b is exposed, thus forming openings 18d in the buried layer 18.

Thereafter, as illustrated in FIGS. 18A and 18B, the resist pattern 43 is removed with an organic solvent. Subsequently, the insulator protective layer 17 on the top surface 30t of the waveguide mesa 30b is etched by $CF_4$ reactive ion etching (RIE) until the contact layer 15 is exposed, thus forming openings 17d. Next, an upper electrode resist pattern (not illustrated) having openings on the waveguide mesa 30b is formed on the buried layer 18 using a photolithography method. Further, as illustrated in FIGS. 19A and 19B, an ohmic metal is evaporated on the buried layer 18 and in the openings 17d. In this manner, upper electrodes E1 are formed on the buried layer 18 and in the openings 17d above the second region 1b. The upper electrodes E1 are electrically connected to the contact layer 15 through the openings 17d. Next, an ohmic metal is evaporated on the back surface 11n of the substrate 11 at the second region 1b, thus forming a lower electrode E2 on the back surface 11n of the substrate 11. In the above-described manner, a semiconductor Mach-Zehnder modulator 1 is manufactured.

According to the method for manufacturing semiconductor Mach-Zehnder modulators 1 described above, the semiconductor protective layer 16 is formed on the side surfaces 30s of the phase control section 34b of the first waveguide arm 34 as well as on the side surfaces 30s of the phase control section 35b of the second waveguide arm 35 above the second region 1b. Further, the first upper electrode E11 is formed on the phase control section 34b, and the second upper electrode E12 is formed on the phase control section 35b. Furthermore, the lower electrode E2 is formed on the back surface 11n of the substrate 11 at the second region 1b. According to this configuration, the semiconductor protective layer 16 formed on the side surfaces 30s of the phase control section 34b allows for reducing the leakage current at the side surfaces 30s of the phase control section 34b when a voltage is applied between the first upper electrode E11 and the lower electrode E2. Further, the semiconductor protective layer 16 formed on the side surfaces 30s of the phase control section 35b allows for reducing the leakage current at the side surfaces 30s of the phase control section 35b when a voltage is applied between the second upper electrode E12 and the lower electrode E2. Furthermore, the buried layer 18 is formed so as to cover the waveguide mesas 30a, 30b and 30c. The buried layer 18, which is composed of, for example, a BCB resin, has a dielectric constant lower than that of the semiconductor layer such as InP. Accordingly, the parasitic capacitance of the waveguide mesas 30a and 30c can be reduced as compared to the structure in which the waveguide mesas 30a and 30c are buried with, for example, a semi-insulating semiconductor layer such as a Fe-doped InP layer. Consequently, the semiconductor Mach-Zehnder modulator 1 achieves an improvement in the accuracy of optical phase control at the phase control section 34b and the phase control section 35b as well as the stabilization of long-term reliability under the application of voltage. Further, high-speed modulation becomes feasible.

According to the methods for manufacturing semiconductor Mach-Zehnder modulators 1, the waveguide mesas 30a. 30b and 30c are formed by dry etching. This dry etching results in forming damaged layers on the side surfaces 30s of the waveguide mesas 30a, 30b and 30c. The presence of such damaged layers increases the leakage current at the side surfaces 30s of the waveguide mesa 30b. To prevent this, damaged layers formed on the side surfaces 30s of the phase control section 34b and on the side surfaces 30s of the phase control section 35b above the second region 1b are removed, whereby the leakage current at the side surfaces 30s of the phase control section 34b and at the side surfaces 30s of the phase control section 35b can be further reduced. Consequently, a further improvement can be achieved in the accuracy of optical phase control at the phase control section 34b and the phase control section 35b. Deviations from designed values of the widths and lengths of the first optical coupler 33 and the second optical coupler 36 lead to substantial changes in characteristics such as wavelength selectivity and coupling efficiency. In order to obtain high coupling efficiency at specific wavelengths, improved accuracy is required for the width and length of the first optical coupler 33 as well as for the width and length of the second optical coupler 36. According to the method for manufacturing semiconductor Mach-Zehnder modulators 1 described above, wet etching having low processing accuracy is not used for the etching of the side surfaces 30s of the waveguide mesa 30a and the side surfaces 30s of the waveguide mesa 30c on the first region 1a and the third region 1c. Thus, high accuracy can be achieved in terms of the width and length of the first optical coupler 33 as well as the width and length of the second optical coupler 36. As a result, the first optical coupler 33 and the second optical coupler 36 can exhibit high coupling efficiency at specific wavelengths, achieving excellent optical waveguide characteristics.

The methods for manufacturing semiconductor Mach-Zehnder modulators 1 according to the invention are not limited to the above embodiment. In the second mask formation step S04 in the above embodiment, the second mask M2 is provided so as to cover the first I/O waveguide 31, the second I/O waveguide 32, the first optical coupler 33, the optical waveguide section 34a and the optical waveguide section 35a; and the second mask M2 is provided so as to cover the optical waveguide section 34c, the optical waveguide section 35c, the second optical coupler 36, the third I/O waveguide 37 and the fourth I/O waveguide 38. However, the practice of the second mask formation step S04 is not limited thereto as long as the second mask M2 is provided so as to cover at least the first optical coupler 33, and the second mask M2 is provided so as to cover at least the second optical coupler 36. Further, the second mask M2 may be provided so as to cover the entirety of the surface above the first region 1a. Furthermore, the second mask M2 may be provided so as to cover the entirety of the surface above the third region 1c.

Principles of the present invention have been described on the basis of preferred embodiments with reference to the drawings. However, those skilled in the art will understand that the embodiments can be changed in terms of details without departing from the principles. Therefore, all the modifications and changes within the scope and the spirit of Claims are claimed as the present invention.

What is claimed is:

1. A semiconductor Mach-Zehnder modulator comprising:
a substrate having a main surface, the main surface including a first region, a second region and a third region sequentially arranged along a direction intersecting with a normal vector of the main surface;
a first waveguide arm and a second waveguide arm provided on the second region, a first optical coupler provided on the first region, and a second optical coupler provided on the third region, each of the first waveguide arm and the second waveguide arm having a waveguide mesa extending within each of the first, second and third regions and including a core layer composed of a semiconductor material;
a first protective layer having a thickness between 200 nm and 300 nm provided on sides of the first waveguide arm and on sides of the second waveguide arm in contact with side surfaces of the waveguide mesa of each of the first and second waveguide arms, the first protective layer being formed of a non-doped semiconductor layer or a semi-insulating semiconductor layer;
a second protective layer formed of a dielectric film;
a buried layer provided on the side surfaces of each waveguide mesa in the first, second, and third regions and on the main surface of the substrate so as to bury each waveguide mesa, the buried layer including a material having a dielectric constant lower than that of the first protective layer;
a first upper electrode provided on the first waveguide arm and on the buried layer disposed on the main surface of the substrate; and
a second upper electrode provided on the second waveguide arm and on the buried layer disposed on the main surface of the substrate, wherein
the first optical coupler is connected to the first waveguide arm and the second waveguide arm,
the second optical coupler is connected to the first waveguide arm and the second waveguide arm,
above the second region, the buried layer is provided on the first protective layer at the sides of the first waveguide arm and the second waveguide arm,
above the second region, the sides of the first and second waveguide arms are not covered by the first upper electrode and the second upper electrode,
above the first region and the third region, the buried layer is provided on side surfaces of the first optical coupler and on side surfaces of the second optical coupler, the side surfaces of the first and second optical couplers not having the first protective layer, above the first region and the third region, the second protective layer is provided between the buried layer and the side surfaces of the first and second optical couplers, and above the second region, the second protective layer is provided between the buried layer and the first protective layer.

2. The semiconductor Mach-Zehnder modulator according to claim 1, wherein the second protective layer is formed of a silicon dioxide film or a silicon nitride film.

3. The semiconductor Mach-Zehnder modulator according to claim 1, wherein the first optical coupler and the second optical coupler include a multi-mode interference coupler.

4. The semiconductor Mach-Zehnder modulator according to claim 1, wherein the buried layer is formed of a benzocyclobutene resin.

5. The semiconductor Mach-Zehnder modulator according to claim 1, wherein the waveguide mesa includes a lower cladding layer, and an upper cladding layer, and the core layer is provided between the lower cladding layer and the upper cladding layer.

6. The semiconductor Mach-Zehnder modulator according to claim 1, wherein the buried layer has openings on the first and second waveguide arms, the first and second upper electrodes are provided in the openings and on the buried layer, and the first and second upper electrodes are in contact with the first and second waveguide arms through the openings.

* * * * *